US011341019B2

(12) United States Patent
Toledano

(10) Patent No.: US 11,341,019 B2
(45) Date of Patent: May 24, 2022

(54) SYSTEM AND METHOD FOR EFFICIENT ESTIMATION OF HIGH CARDINALITY TIME-SERIES MODELS

(71) Applicant: Anodot Ltd., Ra'anana (IL)

(72) Inventor: Meir Toledano, Tel Aviv (IL)

(73) Assignee: Anodot Ltd., Ra'Anana (IL)

( * ) Notice: Subject to any disclaimer, the term of this patent is extended or adjusted under 35 U.S.C. 154(b) by 421 days.

(21) Appl. No.: 16/703,762

(22) Filed: Dec. 4, 2019

(65) Prior Publication Data

US 2020/0233774 A1  Jul. 23, 2020

Related U.S. Application Data

(60) Provisional application No. 62/793,836, filed on Jan. 17, 2019.

(51) Int. Cl.
  *G06F 11/34* (2006.01)
  *G06F 11/30* (2006.01)
  *G06F 16/28* (2019.01)

(52) U.S. Cl.
  CPC ...... *G06F 11/3447* (2013.01); *G06F 11/3006* (2013.01); *G06F 16/288* (2019.01)

(58) Field of Classification Search
  None
  See application file for complete search history.

(56) References Cited

U.S. PATENT DOCUMENTS

| 7,346,593 | B2 * | 3/2008 | Takeuchi | G06F 17/18 706/14 |
| 7,421,380 | B2 * | 9/2008 | Thiesson | G06K 9/00523 702/182 |
| 2021/0081492 | A1 * | 3/2021 | Higginson | G06N 20/00 |

OTHER PUBLICATIONS

Choi, Jaehyung et al.; Geometric shrinkage priors for Kählerian signal filters; Entropy; http://www.mdpi.com/1099-4300/17/3/1347/htm; Issue 3, vol. 17; Mar. 17, 015; 11 pages.
Choi, Jaehyung et al.; Kahlerian information geometry for signal processing; Entropy; http://arxiv.org/abs/1404.2006; Issue 4, vol. 17; Mar. 25, 2015; 24 pages.
Hamilton, James Douglas; Time Series Analysis; 1994; 407 pages.
(Continued)

*Primary Examiner* — Craig C Dorais
(74) *Attorney, Agent, or Firm* — Miller Johnson

(57) ABSTRACT

A system includes a metric data store configured to receive and store a time-series of values of a first metric, a seasonal trend identification module configured to determine a periodicity profile for the first metric, and a modeling module configured to generate an autoregressive moving average (ARMA) model. The modeling module includes a seasonal model module configured to generate a first model of the time-series of values, a non-seasonal model module configured to generate a second model of the time-series of values, and a combination module configured to generate a third model based on the first and second models. The modeling module is configured to, in response to determining that a first periodicity profile describes the time-series of values, output the third model as the ARMA model. The system includes an envelope determination module configured to determine a normal behavior of the first metric based on the ARMA model.

20 Claims, 18 Drawing Sheets

(56) References Cited

OTHER PUBLICATIONS

Berndt, Ernst R. et al.; Estimation and inference in nonlinear structural models; Annals of Economic and Social Measurement, NBER; vol. 3, No. 4; http://www.nber.org/chapters/c10206.pdf; Oct. 1974; 15 pages.

Barndorff-Nielsen, Ole et al.; On the parametrization of autoregressive models by partial autocorrelations; Journal of Multivariate Analysis; Issue 4; vol. 3; 1973; 12 pages.

Broersen, P. M. T. et al.; Practical aspects of moving average estimation; http://documents.irevues.inist.fr/handle/2042/12484; Sep. 21, 1995; 4 pages.

Twagilimana, Joseph; Comparing Time series, Generalized Linear Models and Artificial Neural Network Models for Transactional Data analysis; http://analytics.ncsu.edu/sesug/2006/ST14_06.PDF; 2006; 9 pages.

Briët, Olivier JT et al.; Generalized seasonal autoregressive integrated moving average models for count data with application to malaria time series with low case numbers; PLOS one; http://journals.plos.org/plosone/article?id=10.1371/journal.pone.0065761; Issue 6; vol. 8; Jun. 13, 2013; 9 pages.

McLeod, A. I. et al.; Faster ARMA maximum likelihood estimation; Computational Statistics & Data Analysis; 2008; Issue 4; vol. 52; Nov. 3, 2016; 27 pages.

Gardner, G. et al.; Algorithm AS 154: An algorithm for exact maximum likelihood estimation of autoregressive-moving average models by means of Kalman filtering; Journal of the Royal Statistical Society. Series C (Applied Statistics); Issue 3; vol. 29; 1980; 13 pages.

Collomb, Cedrick; Linear Prediction and Levinson-Durbin Algorithm; Feb. 3, 2009; 7 pages.

Hyndman, Rob J. et al.; Automatic time series for forecasting: the forecast package for R; Jun. 11, 2007; 31 pages.

White, Martha et al.; Optimal Estimation of Multivariate ARMA Models.; AAAI;https://webdocs.cs.ualberta.ca/~bowling/papers/15aaai-arma.pdf; 2015; 12 pages.

* cited by examiner

SYSTEM AND METHOD FOR EFFICIENT ESTIMATION OF HIGH CARDINALITY TIME-SERIES MODELS

CROSS-REFERENCE TO RELATED APPLICATIONS

This application claims the benefit of U.S. Provisional Application No. 62/793,836 filed Jan. 17, 2019. The entire disclosure of the application referenced above is incorporated by reference.

FIELD

The present disclosure relates to automated analysis of observed metrics and more particularly to computerized determination of expected metric performance.

BACKGROUND

Modest computing systems can have hundreds or even thousands of processor cores, memory arrays, storage arrays, networking ports, and additional peripherals. In large-scale computing systems, such as a data center or supercomputer, the number of processor cores can be in the hundreds of thousands to millions. Each hardware component may have a number of associated parameters, such as clock speed, temperature, idle time, etc. Some of these parameters may be reported and/or measured by the computing system itself. Other parameters may be monitored by an associated monitoring system.

These parameters are referred to in this disclosure as metrics and may be defined at a component level, such as available space on a given magnetic disk, or may be at a subsystem level, such as amount of available storage space in a storage area network. Metrics may also be defined at a system level, such as number of transactions per second in the database, delay in returning results for a query, or the length of execution time of a particular function. A monitoring system for a large computing system may measure and/or collect thousands, millions, or even billions of time-series metrics (that is, metrics that are measured repeatedly over time). Monitoring metrics allows for problems to be quickly identified and resolved, hopefully before problems negatively affect business outcomes. Negative effects may include alienating users, missing revenue, decreasing productivity, etc.

Currently, problems are detected by skilled system administrators who manually create rules to generate alerts for specific metrics. For example, an administrator may set a threshold for available disk space such that an alert will be generated when available disk space decreases below 10% of total disk space. For many metrics, the "correct" threshold may not be known a priori. Instead, the administrator may have to observe the metric over time and infer a threshold based on the historical metric values.

Administrators may watch scores of metrics, such as in a dashboard, and use experience and intuition to determine if any of the metrics indicate the onset of a problem. However, regardless of how many computer screens are used, the number of metrics that can be visually tracked is limited.

Big data principles have been applied to the problem of monitoring systems to address the limitations of visual and programmatic oversight by human administrators. Automated processes may evaluate every single metric, a significant advance compared to the tiny fraction that a human administrator can review, and determine normal historical behavior for each metric.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a metric data store configured to receive and store a time-series of values of a first metric. The first metric corresponds to a measurement of computing system performance. The system also includes a seasonal trend identification module configured to determine a periodicity profile for the first metric based on the time-series of values and a modeling module configured to generate an autoregressive moving average (ARMA) model of the time-series of values based on the periodicity profile for the first metric. The modeling module includes a seasonal model module configured to generate a first model that represents a seasonal characteristic of the time-series of values, a non-seasonal model module configured to generate a second model that represents a non-seasonal characteristic of the time-series of values, and a combination module configured to generate a third model based on the first model and the second model. The modeling module is configured to, in response to the periodicity profile indicating that a first periodicity profile describes the time-series of values, output the third model as the ARMA model of the time-series of values. The system further includes an envelope determination module configured to determine an operating envelope that indicates normal behavior of the first metric based on the ARMA model of the time-series of values, an anomaly identification module configured to identify an anomaly in present values of the first metric in response to the present values deviating outside the operating envelope, and an alert module configured to selectively (i) generate an alert message in response to the identified anomaly and (ii) transmit the alert message to a designated user over a network interface.

In other features, the modeling module includes an autocorrelation module configured to calculate a downsampled autocorrelation function (ACF) based on the time-series of values and the periodicity profile. The seasonal model module is configured to generate the first model based on the downsampled ACF. In further features, a rate of the downsampled ACF is proportional to the first periodicity profile.

In yet further features, calculating the downsampled ACF includes calculating an ACF at an integer multiple of a period length associated with the first periodicity profile. In other features, the modeling module includes a residual calculation unit configured to determine a residual of the first model. The non-seasonal model module is configured to generate the second model based on the determined residual of the first model.

In yet other features, the modeling module includes an outlier removal module configured to filter the time-series of values to remove irregularities. Filtering the time-series of values includes discarding values that are either greater than or less than a preceding value by a predetermined threshold. The outlier removal module if further configured to provide the filtered time-series of values to the seasonal trend identification module and the modeling module.

In further features, the modeling module includes a time-series module configured to interpolate and detrend the time-series of values prior to the filtering of the time-series of values by the outlier removal module. In other features, the system includes an anomaly removal module configured to, prior to processing by the modeling module, remove values of the first metric associated with the anomaly identified by the anomaly identification module from the stored time-series of values in the metric data store.

In yet other features, the modeling module includes a standard model module configured to generate a fourth model that represents the time-series of values. The modeling module is configured to, in response to the periodicity profile indicating that no periodicity profile describes the time-series of values, output the fourth model as the ARMA model of the time-series of values. In further features, the fourth model represents the non-seasonal characteristic of the time-series of values. The standard model module is configured to determine parameters of the fourth model based only on the time-series of values.

A computer-implemented monitoring method includes receiving and storing a time-series of values of a first metric that corresponds to a measurement of computing system performance, determining a periodicity profile for the first metric based on the time-series of values, and generating an autoregressive moving average (ARMA) model of the time-series of values based on the periodicity profile for the first metric. Generating the ARMA model of the time-series values includes generating a first model that represents a seasonal characteristic of the time-series of values, generating a second model that represents a non-seasonal characteristic of the time-series of values, generating a third model based on the first model and the second model, and in response to the periodicity profile indicating that a first periodicity profile describes the time-series of values, outputting the third model as the ARMA model of the time-series of values. The method further includes determining an operating envelope that indicates normal behavior of the first metric based on the ARMA model of the time-series of values, identifying an anomaly in present values of the first metric in response to the present values deviating outside the operating envelope, and selectively (i) generating an alert message in response to the identified anomaly and (ii) transmitting the alert message to a designated user over a network interface.

In other features, generating the first model includes (i) calculating a downsampled autocorrelation function (ACF) based on the time-series of values and the periodicity profile and (ii) generating the first model based on the downsampled ACF. In further features, a rate of the downsampled ACF is proportional to the first periodicity profile. In yet further features, calculating the downsampled ACF includes calculating an ACF at an integer multiple of a period length associated with the first periodicity profile.

In other features, generating the second model includes (i) determining a residual of the first model and (ii) generating the second model based on the determined residual of the first model. In yet other features, the method includes filtering the time-series of values to remove irregularities by discarding values that are either greater than or lesser than a preceding value by a predetermined threshold. Generating the first model includes calculating a downsampled ACF based on the filtered time-series of values and the periodicity profile.

In further features, the method includes interpolating and detrending the time-series of values prior to the filtering of the time-series of values. In other features, the method includes removing values of the first metric associated with the identified anomaly from the stored time-series of values.

In yet other features, generating the ARMA model of the time-series values includes generating a fourth model that represents a non-seasonal characteristic of the time-series of values. In response to the periodicity profile indicating that no periodicity profile describes the time-series of values, outputting the fourth model as the ARMA model of the time-series of values. In other features, the method includes in response to receiving new time-series values of the first metric, (i) generating an updated ARMA model and (ii) determining an updated operating envelope that indicates normal behavior of the first metric based on the updated ARMA model.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

When establishing a normal operating envelope for a metric, from which anomalies can be detected, recognizing the periodic nature of the metric will allow for a more detailed and accurate operating envelope to be created. For example, an increase in a corporation's network activity from Sunday to Monday may indicate a weekly cycle rather than a large anomaly. Without recognizing periodicity, the normal operating envelope would need to have an uncertainty large enough to allow for a large deviation from day to day. This may increase the risk that an actual anomaly will not be detected.

Once the periodic nature of the metric is determined, a model of the metric is generated. The model predicts a value of the metric at a given point in time and is used to determine the normal operating envelope. With respect to time-series data, the autoregressive moving average (ARMA) model is an efficient linear Gaussian model.

An ARMA(p,q) model may be expressed as:

$$x_t = \mu + \phi_1 x_{t-1} + \phi_2 x_{t-2} + \ldots + \phi_p y_{t-p} + \varepsilon_t + \theta_1 \varepsilon_{t-1} + \theta_q \varepsilon_{t-q}$$

$x_t$ represents the time-series data, $\phi_i$ and $\theta_i$ are the parameters of the ARMA model, and $\varepsilon_t$ are independent and identically distributed centered Gaussian random variables. Each $\varepsilon_t$ is a function of $x_{t-1}$. The sequence "$\varepsilon_t + \theta_t \varepsilon_t - 1 + \ldots + \theta_q \varepsilon_{t-q}$" represents the prediction error of the ARMA model. For further discussion of time-series analysis and ARMA models, see "Time Series Analysis" by James D. Hamilton (Princeton university Press 1994), the entire disclosure of which is incorporated by reference.

Directly calculating the parameters of the ARMA model for a seasonal time series is computationally expensive and time consuming. To reduce the computation complexity and required time, two models of the seasonal time-series are generated: a first model that only models the seasonal nature (slow dynamics) of the time series and a second model that only models the non-seasonal nature (fast dynamics) of the time series. The two models are then combined to create a single model that captures both the seasonal and non-seasonal aspects of the time-series data while dynamically improving computational efficiency.

Graphical Introduction

Figure 1:
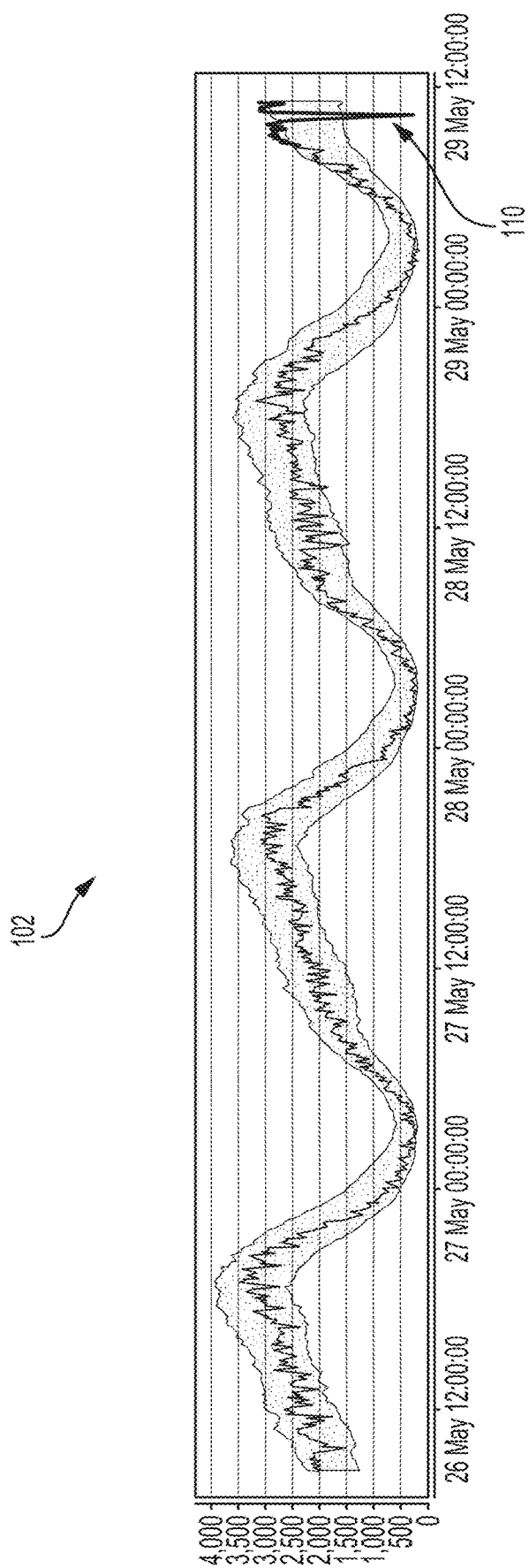
FIG. 1 is a graphical depiction of an example envelope and example values of a metric over time.

FIG. 1 shows an example trace 102 of a metric representing web server activity over time. For example, the trace 102 may depict a number of active web sessions being handled by a physical or virtualized web server. Over the time-span shown in FIG. 1, normal activity for this metric varies between approximately 500 active sessions and 3,500 active sessions. Therefore, an anomaly indicated at 110 remains within this range and may not be detected.

However, if the periodic nature of the trace 102 is recognized, then the expected normal values of the metric can be more tightly constrained according to the period. For example, an envelope 114 may be dynamically created. As a result, the excursion at 110, while within the range of normal values across time, is a clear deviation from the periodicity of the signal as captured by the envelope 114. By recognizing the periodic nature of the metric, the anomaly can be detected, reported, and potentially acted upon without requiring the expertise and labor-intensive review of the metric by an operator.

This may allow anomalies to be identified more quickly before they result in problems and may allow anomalies previously unrecognized to be diagnosed. For example, in various cloud hosting environments, overloading of replication servers or of networking equipment has led to downtime events. With anomaly detection as described in the present application, smaller anomalies that do not lead to downtime events may be identified and their root causes explored before a particularly severe anomaly leads to a downtime event.

System Overview

Figure 2:
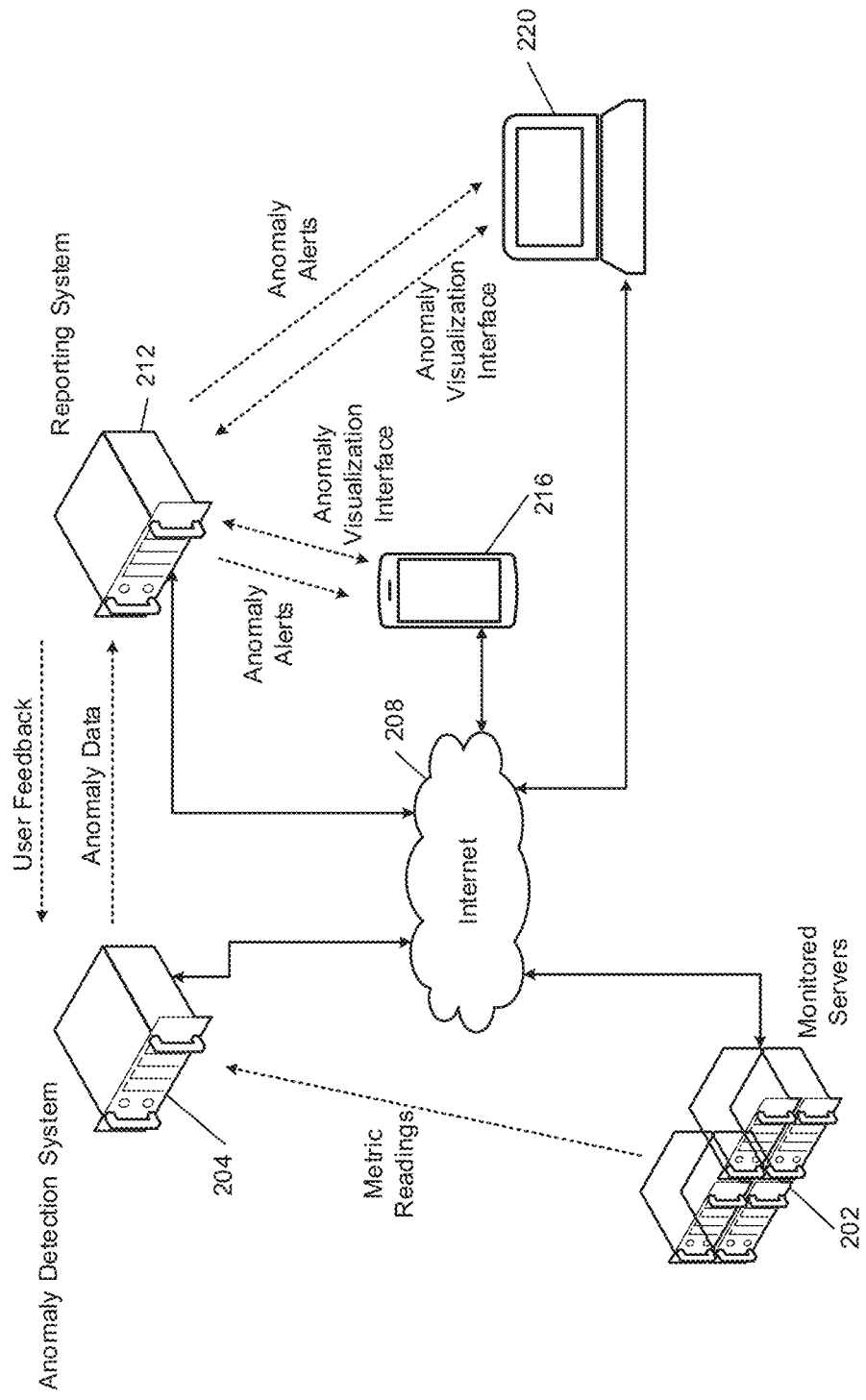
FIG. 2 is a graphical depiction of example elements in a monitored system and the corresponding monitoring system.

In FIG. 2, a set of monitored servers 202 is shown as an example of infrastructure to be monitored. The monitored servers 202 may include production servers as well as monitoring servers that measure metrics of the production servers. Some metrics may be generated and reported automatically while others are measured externally.

Although depicted as computing servers, monitored hardware can include not just computers but other hardware and software capable of instrumentation. For example, industrial control systems, factory automation, etc., may all generate and/or be observed to generate a number of metrics that can be evaluated by an anomaly detection system 204. Further, even within computing hardware, the monitored servers 202 could alternatively or additionally include desktop computers, smartphones, tablets, dedicated hardware (such as storage area networks or voice-over IP systems), etc.

The monitored servers 202 may be physical servers, virtual servers, hosted servers, etc. In one example, the monitored servers 202 may be instances in Elastic Cloud Compute (EC2) from Amazon Web Services (AWS). As shown in FIG. 2 with a dashed line, metric readings are transmitted from the monitored servers 202 to the anomaly detection system 204.

Physically, the metric readings may be transported over the internet, represented at 208, or over any other communication system. The metric readings will generally be encrypted when sent over the internet 208, such as by using a Virtual Private Network (VPN) or some other secure transport facility, such as Secure File Transfer Protocol (SFTP) or Hypertext Transfer Protocol Secure (HTTPS).

The anomaly detection system 204 analyzes the metric readings and, as described in more detail below, characterizes normal and abnormal behavior and determines the significance of detected anomalies. This anomaly data is transmitted to a reporting system 212, which can generate anomaly alerts to system administrators. For example, these anomaly alerts may be sent via text message to a mobile phone 216, by email, or through a monitoring dashboard interface to a laptop 220.

The anomaly detection system 204 and the reporting system 212 may be integrated together and simply referred to collectively as the anomaly detection system 204. They are shown separately in FIG. 2 simply for ease of illustrating their respective functionality. The anomaly detection system 204 and the reporting system 212 may be hosted on dedicated hardware or in cloud computing instances. The data they store may also be stored in dedicated hardware or in cloud storage, such as AWS Simple Storage Service (S3) and/or AWS Elastic Block Store (EBS).

The anomaly detection system 204 and the reporting system 212 may be owned and operated by the provider of the anomaly detection system 204 through a service agreement. Alternatively, the anomaly detection system 204 and the reporting system 212 may be purchased as hardware or as virtual machines and then operated by the owner of the monitored servers 202.

The mobile phone 216 interacts with an anomaly visualization interface presented by the reporting system 212. This interface may allow active anomalies to be seen in real time and may allow prior anomalies to be evaluated. A user of the mobile phone 216 may provide feedback on various reported anomalies to the reporting system 212. For example, this feedback may identify an anomaly as representing a false positive or a true positive. A false positive means that the anomaly does not actually represent anomalous behavior or at least does not indicate an actual or impending issue. Meanwhile, a true positive would mean that the detected anomaly corresponded to some issue with the monitored servers 202.

The laptop 220 may also access the anomaly visualization interface. The interface may be tailored to different screen sizes such as by limiting the information provided to the mobile phone 216 to more significant information than might be shown to the laptop 220. The mobile phone 216 and the laptop 220 may be owned by system administrators employed by the owner of the monitored servers 202, by the provider of the anomaly detection system 204, or by a third party. Such a third party could monitor for anomalies and report to the owner of the monitored servers 202 any impending or identified problems.

The detected anomalies may signify, and be used to examine, a wide variety of issues. These issues include uptime, reliability, security, responsiveness to users, efficient resource usage, business trends, etc.

Anomaly Detection System

Figure 3:
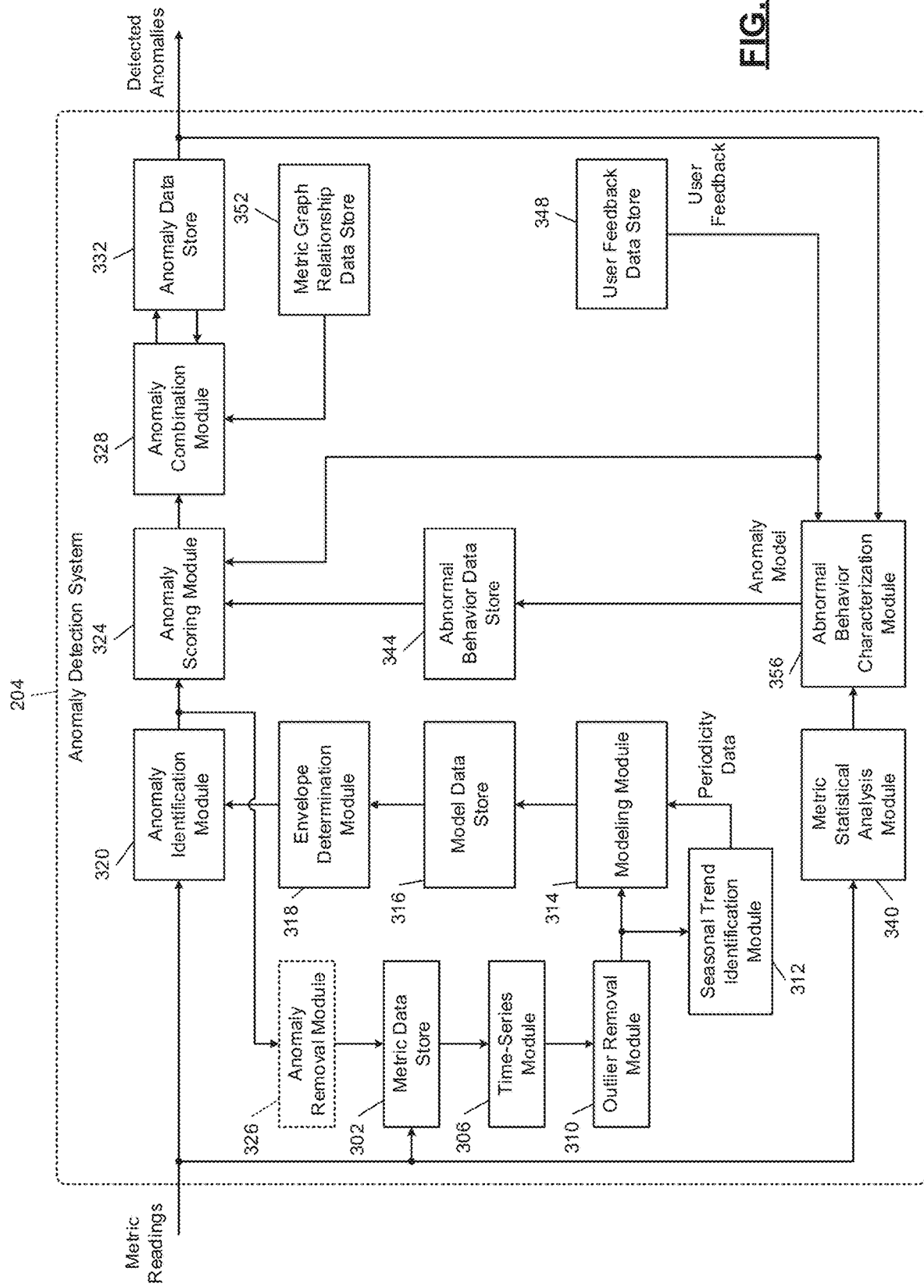
FIG. 3 is a functional block diagram of an example implementation of an anomaly detection system.
Figure 4:
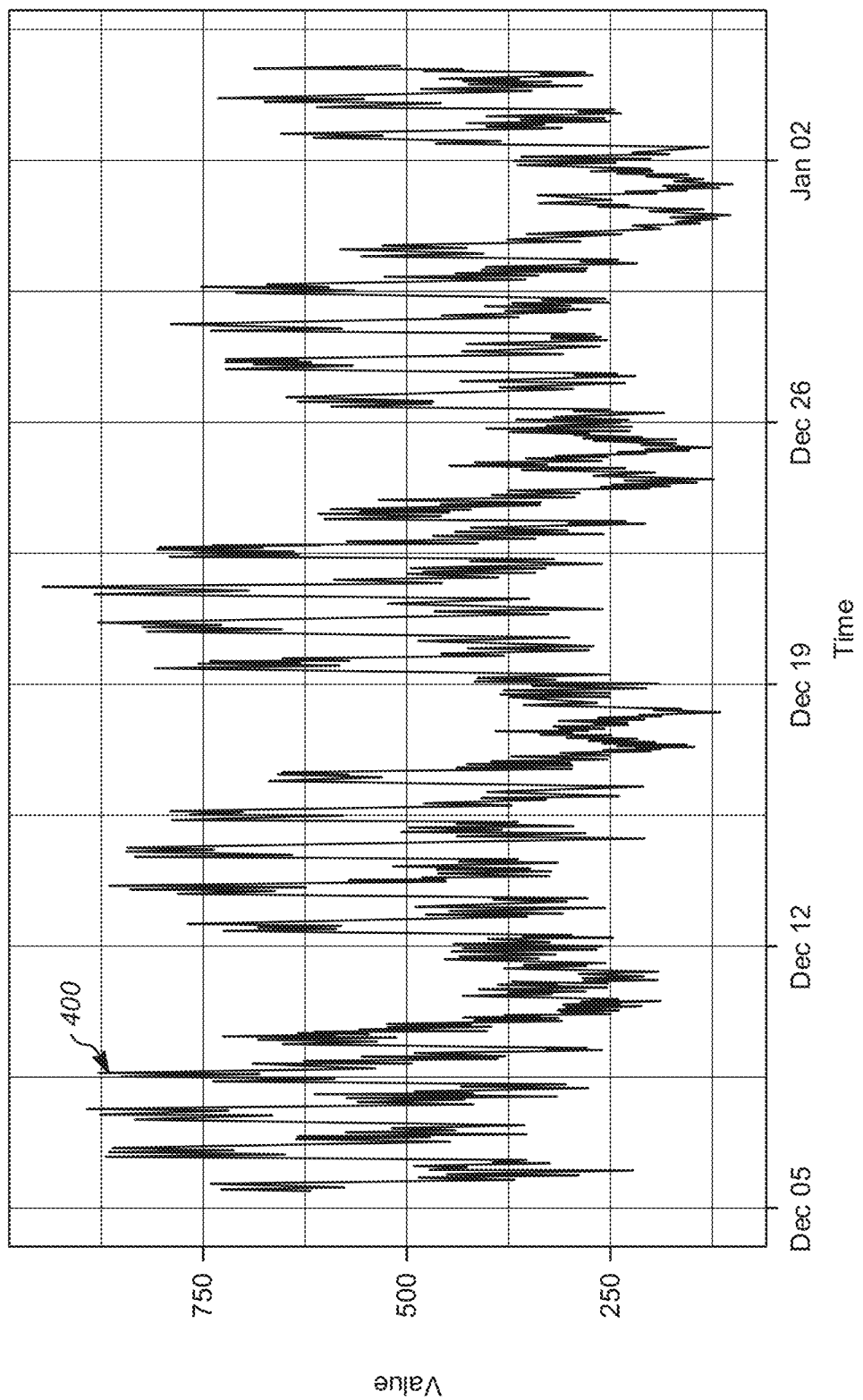
FIG. 4 is a plot of example time-series data.

In FIG. 3, an example implementation of the anomaly detection system 204 is shown. Metric readings are received by the anomaly detection system 204 and stored in a metric data store 302. FIG. 4 is a plot of example time-series data 400 that may be received by the anomaly detection system 204. A time-series module 306 receives stored metric data and generates time-series data based on the metric values. The time-series module 306 identifies contiguous time intervals of the received metric data that are not missing large gaps of metric readings. Each of these sets of contiguous data may be evaluated separately. The time-series module 306 may supply missing data points for small gaps in the data, such as by interpolating. Interpolation may be linear or more elaborate, such as higher-order polynomial interpolation. The time-series module 306 may also de-trend the data. The time-series module 306 provides the time-series data to an outlier removal module 310.

The outlier removal module 310 filters out extreme irregularities from the received time-series data. For example, the outlier removal module 310 may remove data points associated with a malfunctioning sensor. The outlier removal module 310 may remove data points that are greater or less than an immediately preceding data point by a predetermined value. As an example, the outlier removal module 310 may filter out a data point that is at least five times greater than or five time smaller than a preceding value. In other implementations, the predetermined value by be another suitable value that coarsely filters the time-series data to remove extreme irregularities. Interpolation may be used to replace the removed irregularities. The outlier removal module 310 provides the filtered time-series data to a seasonal trend identification module 312 and a modeling module 314.

The seasonal trend identification module 312 analyzes readings of a metric over a period of time, such as days, weeks, or months, and identifies whether there are seasonal trends in the metric. Seasonal trends may, for example, identify that each seven-day period contains five consecutive days where activity for the metric is higher than the remaining two days. Of course, this likely corresponds to the standard five-day work week.

The seasonal trend identification module 312 may also determine that twenty-four-hour cycles are present, where the expected value of the metric may differ depending on the time of day. In various implementations, identification of these seasonal trends may be completely algorithmic, with no preset information provided to the seasonal trend identification module 312 about the existence of seven-day weeks, twenty-four-hour days, etc. In other implementations, some knowledge may be designed in, such as ranges corresponding to anthropocentric schedules, such as the 24-hour day, the 7-day week, and the 365.25-day year.

The modeling module 314 generates a model of the time-series data. In response to the seasonal trend identification module 312 identifying a seasonal trend in the time-series data, the modeling module 314 generates a seasonal ARMA model of the time-series data. Specifically, the modeling module 314 generates a model of the seasonal dynamic of the time-series data and a model of the non-seasonal dynamic of the time-series data. The modeling module 314 then merges the two models to generate the seasonal ARMA model of the time-series data. In response to the seasonal trend identification module 312 not identifying a seasonal trend in the time-series data, the modeling module 314 generates a standard ARMA model of the time-series data.

A model data store 316 stores models of the time-series data generated by the modeling module 314. Based on the stored models of the time-series data, an envelope determination module 318 determines a normal operating envelope for the metric. The normal operating envelope may be a function of time, and may define a range of expected values for each point in time. The range of expected value may be based on a Gaussian distribution.

An anomaly identification module 320 can then use the normal operating envelope from the envelope determination module 318 to determine what the readings of a metric should be and identify deviations from the normal operating envelope. When an anomaly in a metric is identified, this detection is provided to an anomaly scoring module 324.

In some implementations, the anomaly detection system 204 may include an anomaly removal module 326. The anomaly removal module removes metric readings associated with an anomaly identified by the anomaly identification module 320 from the metric data store 302. In this way, the anomaly detection system 204 only uses metric readings associated with normal operation to generate the model of the metric reading and, subsequently, the normal operating envelope.

The anomaly scoring module 324 determines a score for the detected anomaly based on how significant the anomaly appears to be. As the intensity of the anomaly increases (that is, the amount of deviation of the metric away from the baseline), and as the duration of the anomaly increases, the score correspondingly increases. An anomaly combination module 328 combines the score for the single metric calculated by the anomaly scoring module 324 along with the scores of other detected anomalies. These scores, and in some cases other characteristics of the other anomalies, are stored in an anomaly data store 332.

The anomaly data store 332 provides details of anomalies for other metrics to the anomaly combination module 328 and also stores scores and data related to combined anomalies as determined by the anomaly combination module 328. The anomaly data store 332 also provides information about the detected anomalies to, for example, the reporting system 212 of FIG. 2.

The detected anomalies are analyzed by an abnormal behavior characterization module 336 to determine a model of anomalies experienced by each metric. A metric statistical analysis module 340 may determine statistics for each metric, such as absolute minimum value, absolute maximum value, mean, median, standard deviation, etc. The absolute minimum and maximum values determine a range within which the metric operates. For example, the values of a CPU utilization metric will generally fall within a range between 0% and 100%.

The metric statistical analysis module 340 allows the anomaly detection system 204 to determine these ranges without explicit input from operators of the monitored servers 202. Using statistical analysis, the metric statistical analysis module 340 can determine that, for example, a metric of CPU utilization varies between 12% and 100% while a query response time varies between 40 and 3000 (which may represent time in milliseconds).

The abnormal behavior characterization module 336 analyzes anomalies for a metric from the anomaly data store 332 and statistical values for the metric from the metric statistical analysis module 340 and generates an anomaly model for storage in an abnormal behavior data store 344.

The anomaly model may also be based on user feedback from a user feedback data store 348. For example, anomalies identified by the user as being less significant or not representative of actual problems may be weighted more heavily in determining the anomaly model. The anomaly scoring module 324 uses the anomaly model for the metric from the abnormal behavior data store 344 to determine how significant a given anomaly is. For example, if the intensity of the detected anomaly is greater than the typical anomaly for the metric, this is an indication of greater significance. Further, if the duration of the anomaly has already exceeded an expected value of anomaly duration, this is yet another indication of significance of the anomaly.

When combining multiple anomalies into a single combined anomaly, relationships between the metrics are specified by a metric graph relationship data store 352. When multiple anomalies are present across related metrics, this may be an indication of greater significance of the combined anomaly.

Seasonal Trend Identification Module

Figure 5:
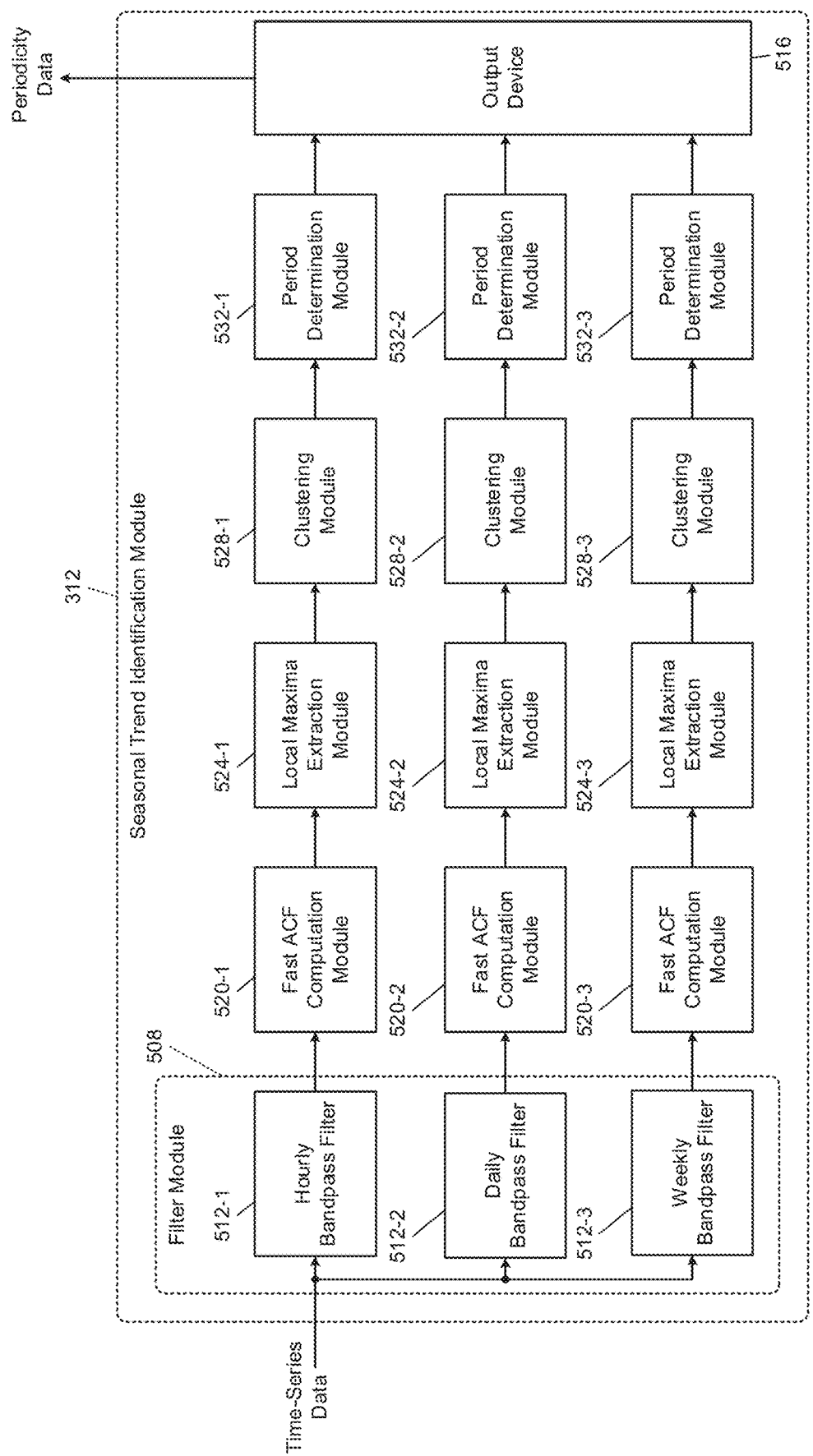
FIG. 5 is a functional block diagram of an example implementation of the seasonal trend identification module of FIG. 3.

In FIG. 5, an example implementation of the seasonal trend identification module 312 includes a filter module 508 that filters the time-series data. For example, the filter module 508 may apply one or more bandpass filters targeted at different ranges of periodicity. For example, when evaluating metrics tied to real-world workloads that may vary on a daily, hourly, or weekly basis, the following filters may each be applied to the processed data: an hourly bandpass filter 512-1 with a pass-band centered about a period of approximately one hour, a daily bandpass filter 512-2 with a pass-band centered about a period of approximately one day, and a weekly bandpass filter 512-3 with a pass-band centered about a period of approximately one week (collectively, "filters 512").

The filters implemented by the filter module 508 may be specified during configuration of the seasonal trend identification module 312 for certain metrics. For different metrics, the filters implemented by the filter module 508 may be configured differently and there may be more or fewer filters. In various implementations, the filters 512 may be implemented digitally as third-order Butterworth filters, as described in more detail below.

Each filtered output from the filter module 508 is processed separately until an output device 516 provides a period profile to the modeling module 314. In some implementations, the period profile is simply a single selected period from across the filtered sets of data. In other examples, the period profile may represent more than one of the determined periods.

Although FIG. 5 depicts a set of processing modules corresponding to each filtered data set, some or all of the modules may take turns processing different filtered data. Each set of filtered data may be processed in parallel or the sets of filtered data may be processed one after another in series. In some implementations, there may be three sets of hardware and/or software for processing filtered data that share responsibility for the sets of filtered data. For example, if only two sets of filtered data are produced by the filter module 508, the three sets of processing hardware may share the processing task of the two sets of filtered data. For example, two sets of processing hardware may cooperate together to process one set of filtered data.

Frequency domain analysis, and particularly the Fourier transform, are often used to identify periodicity in a signal. When that signal is discrete sampled data, the discrete Fourier transform (DFT) is used. However, the DFT is a linear function, meaning that noise present in the signal will also show up in the frequency domain signal calculated by the DFT.

Figure 6:
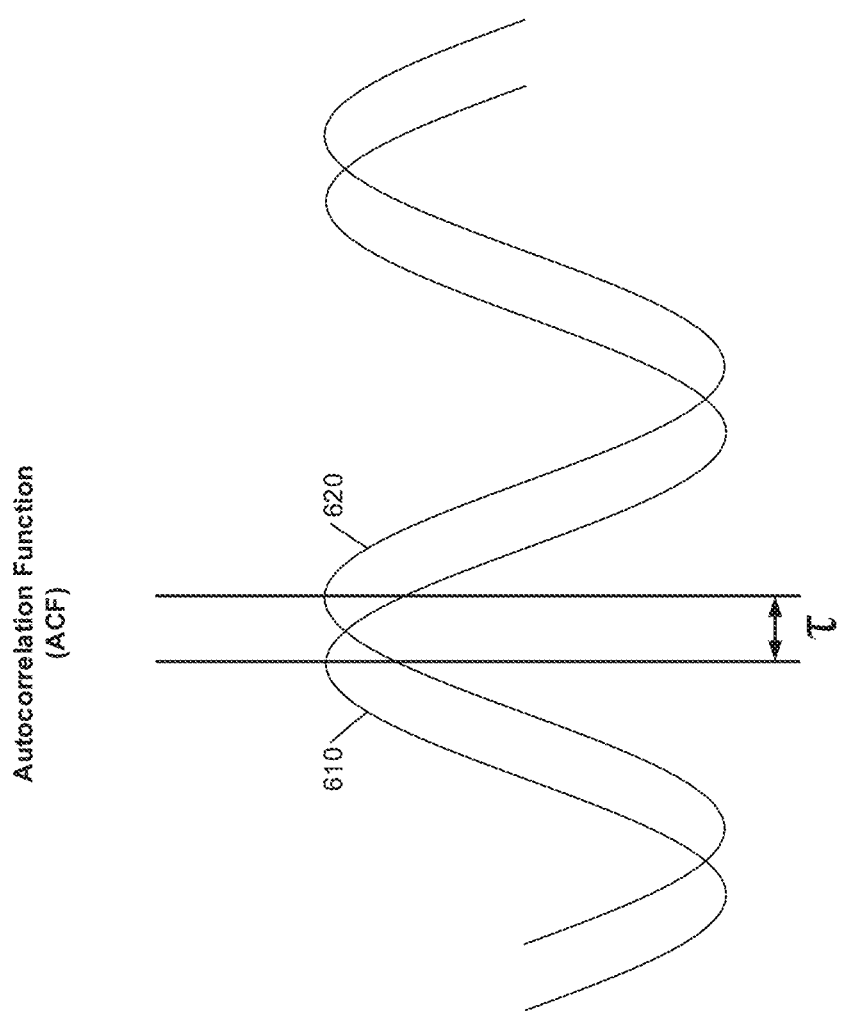
FIG. 6 is a graphical illustration of an autocorrelation function (ACF).

To address this problem, an autocorrelation function (ACF) may be used. In FIG. 6, an example signal 610 is time shifted by an amount $\tau$, which results in trace 620. Calculating the correlation coefficient between the signal 610 and trace 620 establishes a value of the ACF for that value of $\tau$. For random noise, the ACF at all non-zero values of $\tau$ is zero. Therefore, the ACF rejects noise and other anomalies. The ACF is also more robust to missing samples in the input data.

Further, while the ACF may identify a multiple of the fundamental frequency as the periodicity, this is less problematic than when a frequency-domain analysis identifies a harmonic instead of the fundamental frequency. With the DFT, the harmonics are multiples of the frequency, leading to misidentification of a higher-than-actual frequency. Advantageously, with the ACF, the observed multiples are multiples of the period. As a result, a period twice as long (that is, half the frequency) of the actual period is determined. While not optimal, identifying a doubled period, as with the ACF, is far preferable to a doubled frequency, as with the DFT. This makes the ACF a more robust approach.

For at least the above reasons, the ACF also allows for identification of low-frequency patterns in the presence of high-frequency repetition. In the description below, the present disclosure is developed for a time span of periodic patterns with a period of between approximately one hour and one week. However, the present disclosure can be applied to any other periods of time for which sampled data is available.

While the DFT is computationally fast, executing in $O(N \cdot \log(N))$, the ACF requires $O(N^2)$ processing time. On large data sets, calculation of the ACF may therefore be practically impossible. As described in more detail below, the ACF can be sampled at non-linear increments. For example, given a metric sampled once per second, the autocorrelation function could be evaluated with a one-second offset, a two-second offset, etc., all the way to the full length of the input time-series.

However, the difference between evaluating the ACF at 30 seconds and 31 seconds is much more statistically significant than the difference between evaluating the ACF at one week and one week plus one second. In other words, for larger values of the ACF, larger increments can be used between the evaluated values. For example, geometric sampling may be used so that the differences between the evaluated ACF values are proportional to the absolute values being evaluated. Evaluating the ACF with constant increments is very costly in terms of processing time as well as memory storage even for a single metric. When analyzing orders of magnitude more metrics, such as millions of metrics, constant increments may be completely infeasible. While increased memory size may allow for reduced processing time, using non-linear sampling of the ACF will allow for a reduction in one or both of memory footprint and processing time.

Fast ACF computation modules 520-1, 520-2, and 520-3 calculate the ACF for the sets of filtered data, respectively, from the filter module 508. Local maxima extraction modules 524-1, 524-2, and 524-3 identify local maxima of the respective ACF data. Clustering modules 528-1, 528-2, and 528-3 perform a clustering analysis on the respective local maxima. Period determination modules 532-1, 532-2, and 532-3 identify significant periods from the respective clustering analysis and each output a significant period value to the output device 516. In some implementations, the period determination modules 532 will output an indication that no period is identified if no period from the clustering analysis appears to be significant.

The processing hardware corresponding to the hourly bandpass filter 512-1 will be described, and the processing hardware corresponding to the daily bandpass filter 512-2 and the weekly bandpass filter 512-3 may be implemented similarly. In fact, when processing hardware is implemented as computer-executable instructions executing on a processing system, the same code may simply be called with respect to each of the outputs of the hourly bandpass filter 512-1, the daily bandpass filter 512-2, and the weekly bandpass filter 512-3.

The fast ACF computation module 520-1 computes the ACF, which may be defined as follows:

$$\rho(\tau) = \mathbb{C}or(X_t, X_{t+\tau}) \quad (1)$$
$$= \frac{\mathbb{E}[(X_t - \mathbb{E}[X_t])(X_{t+\tau} - \mathbb{E}[X_{t+\tau}])]}{\sqrt{\mathbb{V}ar[X_t]\mathbb{V}ar[X_{t+\tau}]}}$$
$$= \frac{\mathbb{E}[X_t \cdot X_{t+\tau}] - \mathbb{E}[X_t]\mathbb{E}[X_{t+\tau}]}{\sqrt{\mathbb{V}ar[X_t]\mathbb{V}ar[X_{t+\tau}]}}$$
$$= \frac{\mathbb{E}[X_t \cdot X_{t+\tau}] - \mathbb{E}[X_t]\mathbb{E}[X_{t+\tau}]}{\sqrt{(\mathbb{E}[X_t^2] - \mathbb{E}[X_t]^2)(\mathbb{E}[X_{t+\tau}^2] - \mathbb{E}[X_{t+\tau}]^2)}}$$

For each value of $\tau$, the ACF computation requires O(N) operations, where N is the length of the series. So the computation of the ACF for all N values of $\tau$ is an O(N²) algorithm. However, as mentioned above, sampling the ACF for every possible value of $\tau$ may provide unnecessarily high precision at high values of $\tau$. For example, consider a series sampled every 300 seconds (five minutes) during a month. The precision $\Delta\tau$ of the ACF when $\tau$ is equal to two weeks is:

$$\frac{\Delta\tau}{\tau} = \frac{300}{2*7*24*3600} \approx 2.4 \cdot 10^{-4} \quad (2)$$

This precision is higher than necessary and very costly in terms of memory footprint and processing time. The present disclosure therefore samples $\tau$ at greater intervals as $\tau$ increases. In other words, the present disclosure reduces the range of $$\frac{\Delta\tau}{\tau}.$$

or example, the precision $$\frac{\Delta\tau}{\tau}$$

may be held approximately equal. To keep the precision $$\frac{\Delta\tau}{\tau}$$

at a constant value of c (such as 0.005), $\tau$ will be sampled geometrically:

$$\tau_n = \tau_0 c^n \quad (3)$$

This in contrast to the linear sampling of the traditional ACF:

$$\tau_n = \tau_0 n \quad (4)$$

The number of data points of the ACF is then only log(N), making the complexity of the algorithm O(N·log(N)).

In some implementations, the fast ACF computation module 520-1 may constrain the value of $\tau$ according to the expected periodicity for the filtered data. As an example, since the filtered data received by the fast ACF computation module 520-1 has been bandpass filtered around a one-hour period, periodicity below some threshold (such as half of the middle period of the passband, or 30 minutes in this example) would not be expected. As a result, the fast ACF computation module 520-1 may begin evaluating the ACF at that threshold value of ti (30 minutes in this example).

The local maxima extraction module 524-1 identifies the local maxima of the computed ACF. This is because time-series data having a period T will result in an ACF that has a local maximum at each multiple of T. An ACF calculated from real-world data may have a large number of local maxima. As a result, the present disclosure focuses on maxima above a certain threshold. This threshold may be constant or may vary with $\tau$. In order to determine whether a correlation coefficient at $\tau$ is statistically relevant, Fisher's method indicates that P($\tau$) transformed by S will follow a Gaussian law, which depends on the number of points used to build the correlation coefficient. See Equation 5:

$$S(\rho(\tau)) = \frac{1}{2}\ln\left(\frac{1+\rho(\tau)}{1-\rho(\tau)}\right) \cdots \rightarrow N\left(0, \frac{1}{\sqrt{N-\tau-3}}\right) \quad (5)$$

A P value may be chosen based on a desired probability of mistakes. For example, the P value may be set to 1E-4. The threshold may then be calculated as a function of $\tau$ by solving Equation 6 for $\tau$:

$$S(\rho(\tau))\sqrt{N-\tau-3} > P_{value} \quad (6)$$

Figure 7:
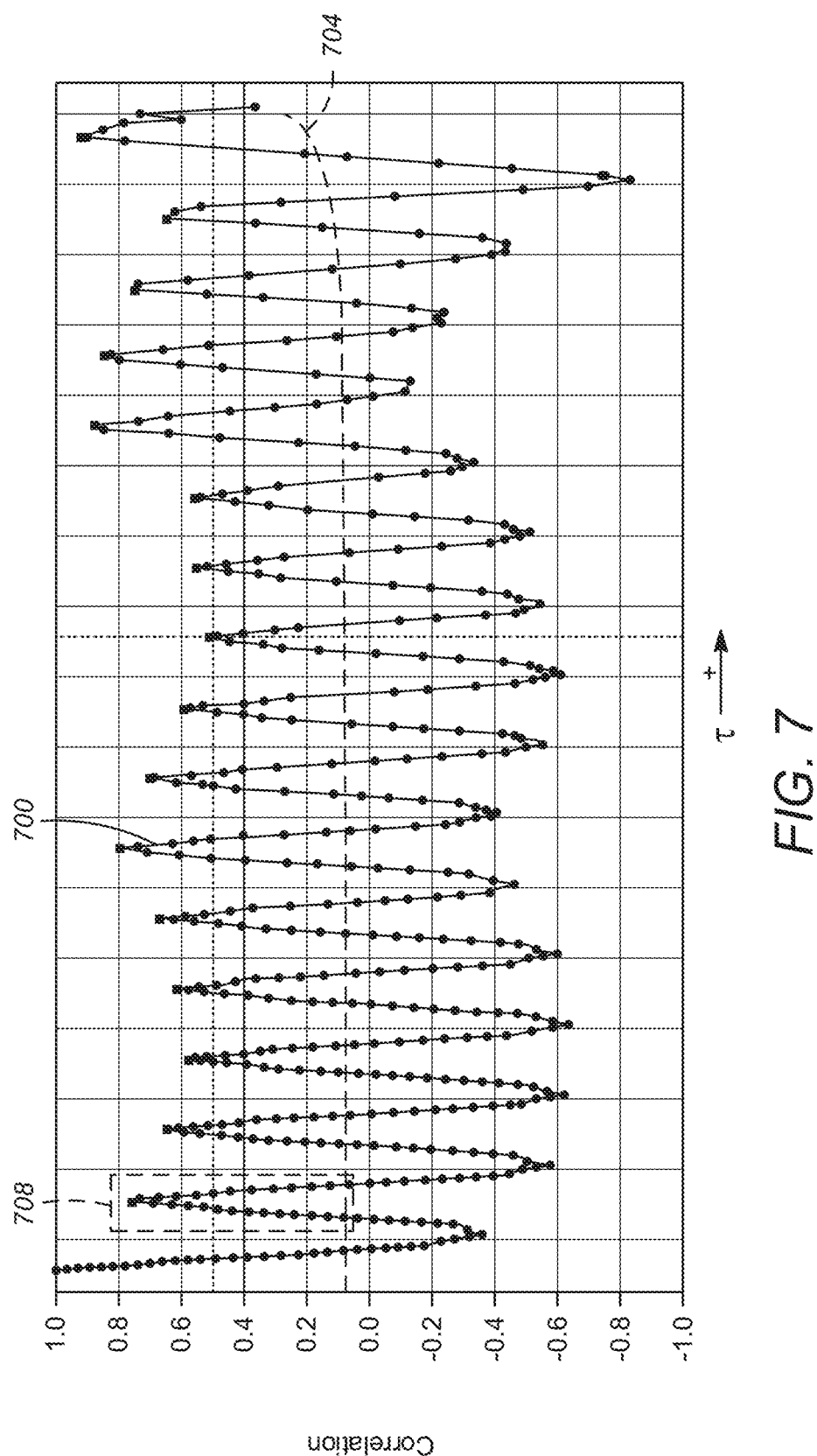
FIG. 7 is a plot of an ACF of time-series data.

The threshold divides the ACF into a set of segments. For example, see FIG. 7, in which an example trace 700 of an ACF and a threshold curve 704 are shown. Each segment of the ACF begins when the ACF crosses the threshold 704 in a positive direction and ends when the ACF crosses the threshold 704 in a negative direction. In FIG. 7, a first segment 708 of the ACF 700 is shown with a rectangle. The global maximum of each segment is a local maximum of the ACF 700. By splitting the ACF 700 into segments above the threshold 704, each global maximum of the segment is a statistically significant ACF value.

The clustering module 528-1 clusters the local maxima determined from the ACF. First, the difference in τ between each pair of consecutive local maxima is determined. These differences, indicating the spacing of the local maxima, are then clustered. The cluster having the greatest count of inter-maximum differences indicates the periodicity of the ACF.

The period determination module 532-1 determines whether the occurrence count of any cluster is above a threshold. A number of occurrences below the threshold may indicate that the detected cluster is not statistically significant. With perfectly periodic input data, a series of duration D and period T will have exactly $$\frac{D}{T}$$

local maxima. However, with real-world data, the threshold will have to be set lower than this theoretical peak. In one example, the threshold is set to be half the theoretical peak—that is, $$\frac{1}{2}\frac{D}{T}.$$

Figure 8:
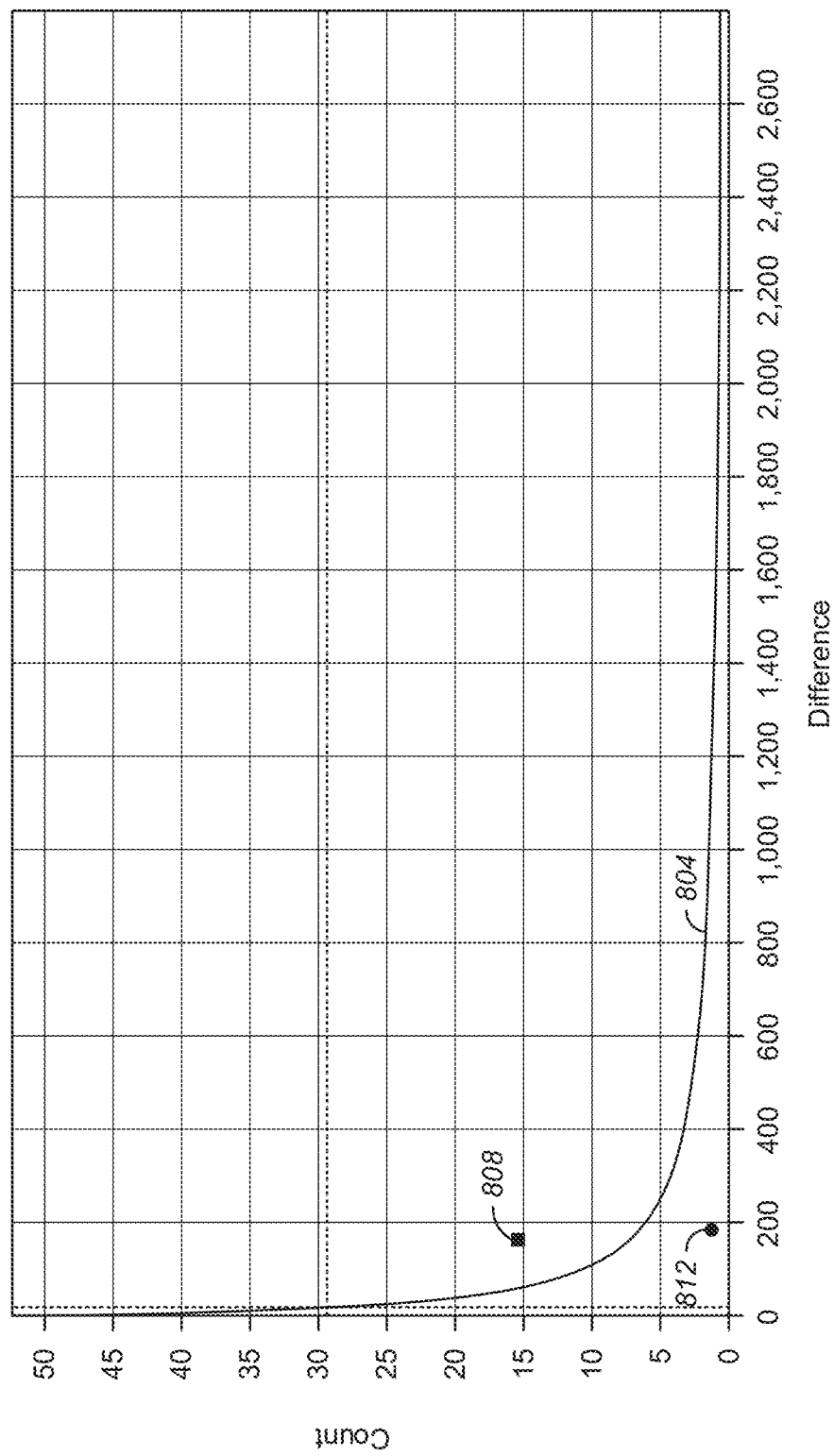
FIG. 8 is a scatter plot of the occurrence count for clusters of the maximum-to-maximum differences from the ACF of FIG. 8 and includes a graphical trace of a threshold inequality.

In FIG. 8, a threshold 804 is graphically plotted based on the function $$\frac{1}{2}\frac{D}{T}.$$

Clusters 808 and 812 are plotted based on the number of occurrences indicated by the clustering module 528-1. The cluster 812 lies below the threshold 804 and is therefore determined not to be statistically significant. The cluster 808 lies above the threshold 804 and therefore indicates periodicity of the ACF.

The period determination module 532-1 outputs the highest occurrence inter-maximum difference as the significant period for the present filtered data. If no clusters have an occurrence count above the threshold 804, the period determination module 532-1 may indicate that no significant period was found.

The output device 516 may select the significant period that has the lowest frequency for output to the modeling module 314. In other implementations, the output device 516 may output all identified significant periods, meaning that the period profile may have as many indicated periods as there are filter bands. The output device 516 may perform a sanity check on any identified significant period by comparing that period to the passband of the filter corresponding to the identified significant period. If an identified significant period is outside of the corresponding passband, then the output device 516 may discard the identified significant period.

Modeling Module

Figure 9:
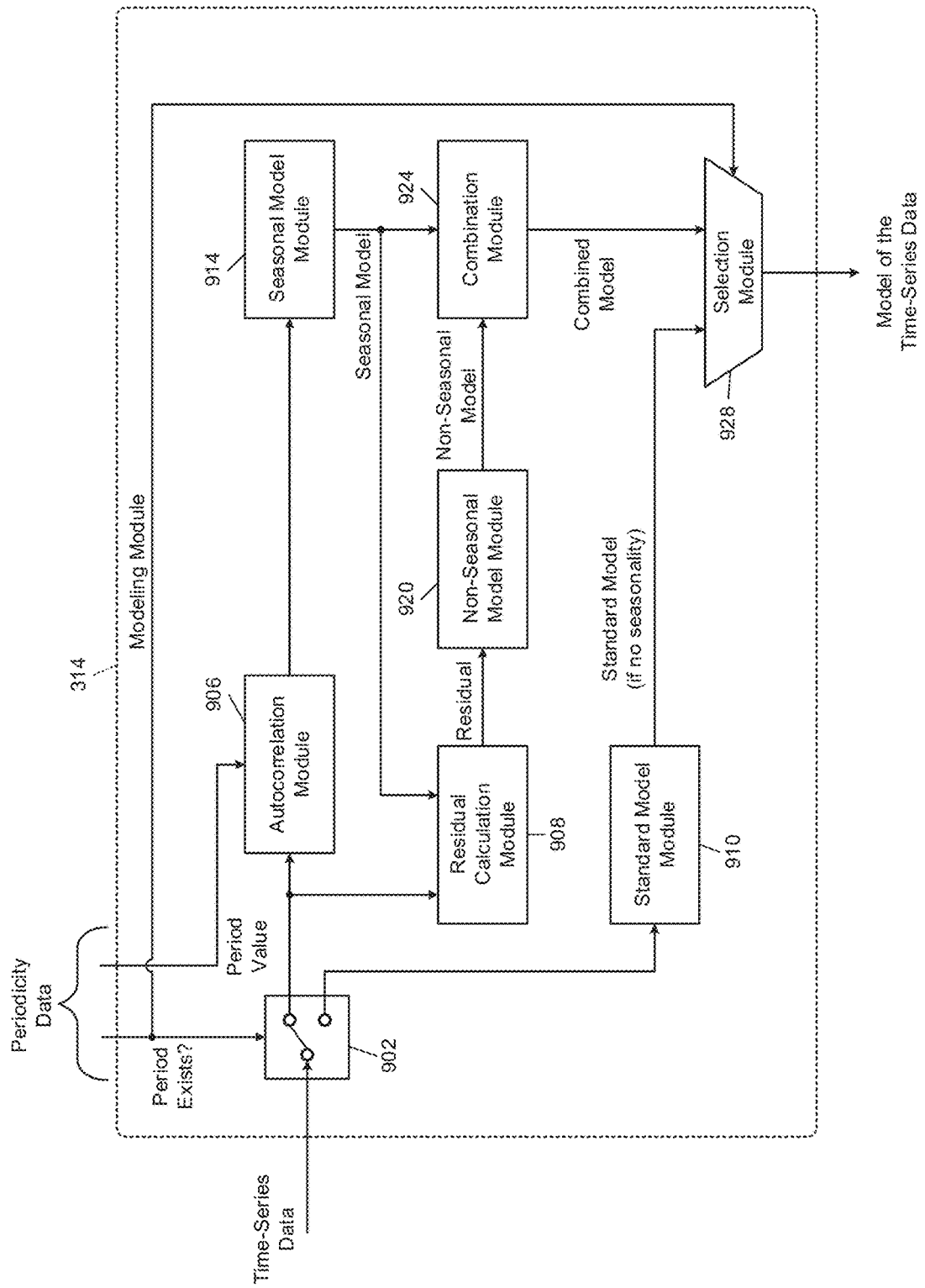
FIG. 9 is a functional block diagram of an example implementation of the modeling module of FIG. 3.

In FIG. 9, an example implementation of the modeling module 314 includes a selector 902 that provides received time-series data either to an autocorrelation module 906 and a residual calculation module 908 or to a standard model module 910, based on the periodicity of the received time-series data. For example, in response to the periodicity data—such as data from the seasonal trend identification module 312—indicating that a first periodicity profile defines the time-series data, the selector 902 provides the time-series data to the autocorrelation module 906 and the residual calculation module 908. Alternatively, in response to the periodicity data indicating that a period does not exist in the time-series data, the selector 902 provides the time-series data to the standard model module 910.

The autocorrelation module 906 performs a downsampled ACF on the supplied time-series data based on the periodicity data received from the seasonal trend identification module 312. The autocorrelation module 906 determines a length of a season in the time-series data based on the value of the identified period and the sample rate of time-series data. For example, in response to the time-series data representing metric values sampled every 5 minutes and the periodicity data indicating a weekly period, the autocorrelation module 906 determines that the time-series data expresses a seasonal trend every 2016 samples.

The autocorrelation module determines a seasonal difference of the supplied time-series data. For example, the autocorrelation module may use Equation 7 to calculate the seasonal difference.

$$y_t = x_{t+s} - x_t \tag{7}$$

where $x_t$ is the time-series data, s is the number of samples in the identified season, and $y_t$ is the seasonal difference.

Figure 10:
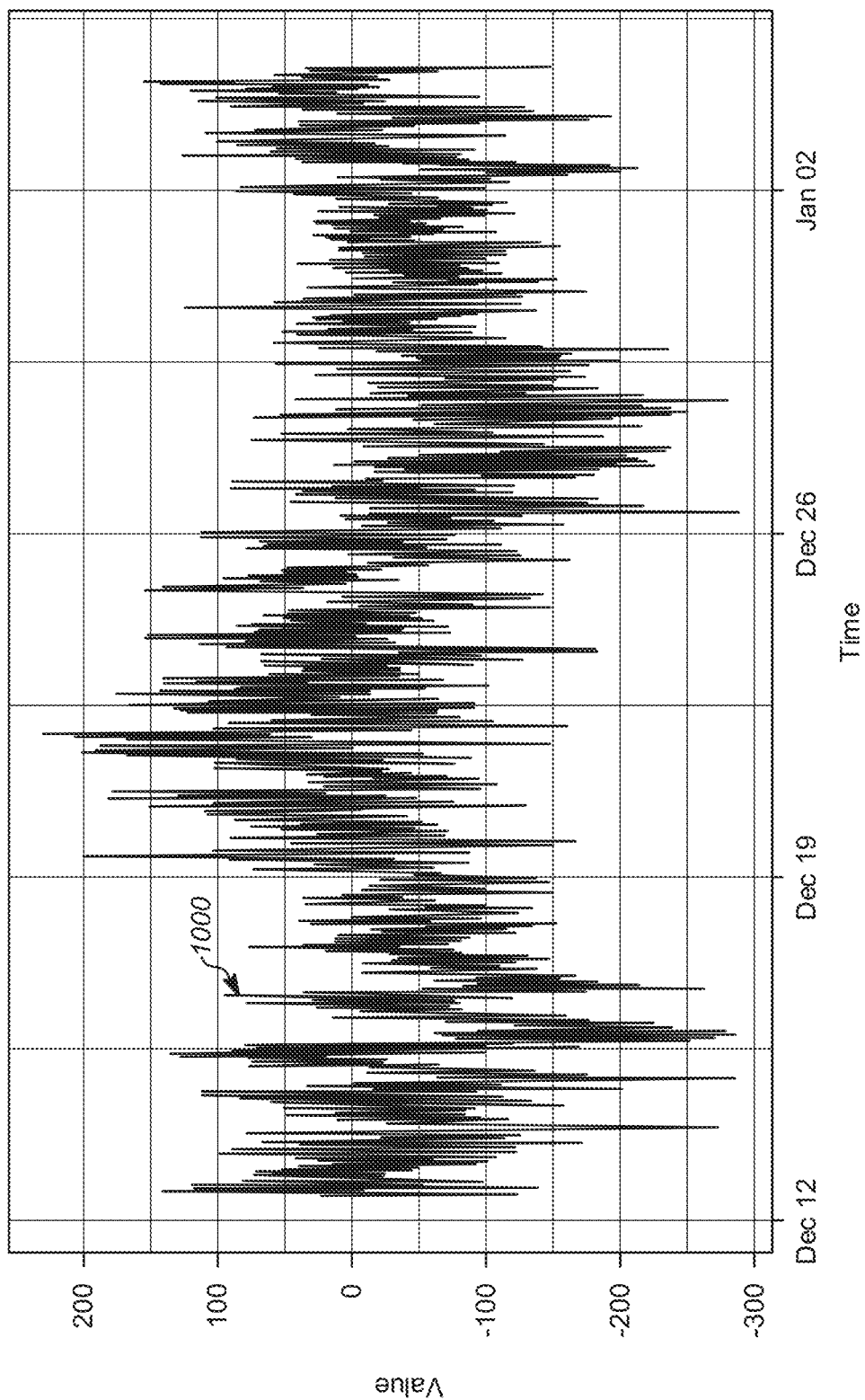
FIG. 10 is a plot of the seasonal difference of the example time-series data of FIG. 4.
Figure 11:
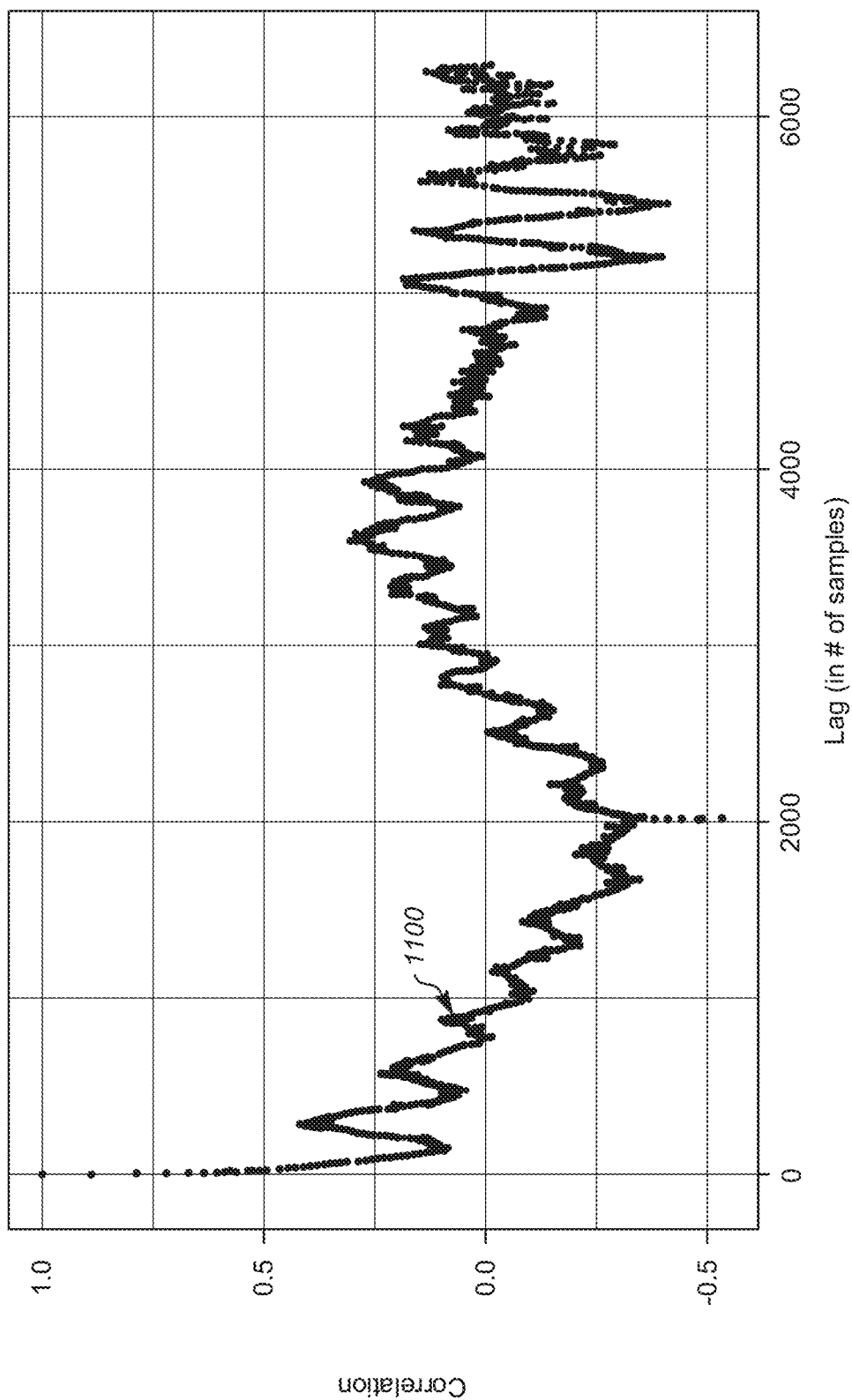
FIG. 11 is a plot of an ACF of the seasonal difference of FIG. 10.

The example time-series data 400 depicted in FIG. 4 includes a weekly season. FIG. 10 is a plot of a seasonal difference 1000 of the example time-series data 400. FIG. 11 is a plot of an ACF 1100 of the seasonal difference 1000.

The autocorrelation module 906 performs the downsampled ACF on the seasonal difference of the time-series data by computing the value of the ACF for values of τ that are integer multiples of the identified season. For example, the autocorrelation module 906 may perform a linear sampling of the traditional ACF using Equations 1 and 4, as described above, to compute the value of the downsampled ACF.

Figure 12:
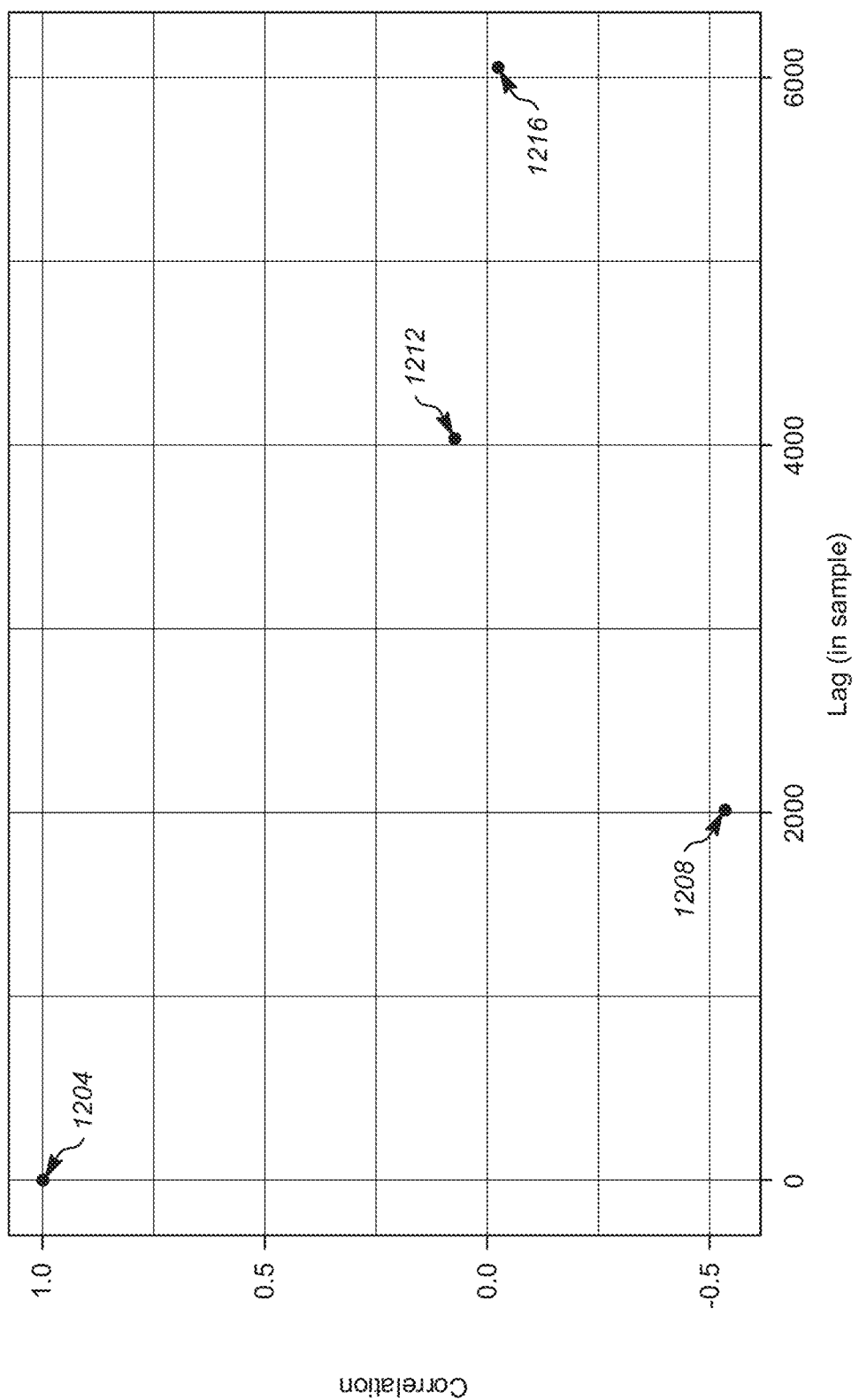
FIG. 12 is plot of a downsampled ACF of seasonal difference of FIG. 11.

FIG. 12 is a plot of the downsampled ACF of the seasonal difference 1000. The downsampled ACF depicted in FIG. 12 includes four values: 1204, 1208, 1212, and 1216.

The autocorrelation module 906 provides the results of the downsampled ACF to a seasonal model module 914 that determines a seasonal dynamic ARMA model of the time-series data. The seasonal model module 914 first generates an ARMA model of the downsampled ACF and then resamples the generated model to produce the seasonal dynamic ARMA model that represents the seasonal aspect of the time-series data.

The seasonal model module 914 generates the ARMA model of the downsampled ACF by initializing the autoregressive parameters of the ARMA model. The ARMA model of the seasonal difference may be expressed as:

$$y_t = \phi_1^* y_{t-1} + \phi_2^* y_{t-2} + \ldots + \phi_p^* y_{t-p} + z_t^* \tag{8}$$

Coefficients $\phi_1^* \ldots \phi_p^*$ are the autoregressive parameters of the ARMA model of the seasonal difference and $z_t^*$ is the residual of the model. The seasonal model module 914 may use the Yule-Walker equation to link the values of the ACF with the autoregressive parameters of the ARMA model of the seasonal difference—the $\phi^*$ coefficients in Equation 8 above. For example, the relationship between the ACF values and the autoregressive parameters may be expressed as Equation 9 below.

$$\begin{pmatrix} 1 & \cdots & \cdots & \cdots & \cdots & \cdots & \rho(p-1) \\ \vdots & \ddots & \cdots & \cdots & \cdots & \cdots & \cdots \\ \vdots & \vdots & 1 & \rho(1) & \rho(2) & \cdots & \cdots \\ \vdots & \vdots & \rho(1) & 1 & \rho(1) & \cdots & \cdots \\ \vdots & \vdots & \rho(2) & \rho(1) & 1 & \cdots & \cdots \\ \vdots & \vdots & \vdots & \vdots & \vdots & \ddots & \cdots \\ \rho(p-1) & \vdots & \vdots & \vdots & \vdots & \vdots & 1 \end{pmatrix} \begin{pmatrix} \phi_1 \\ \vdots \\ \phi_{k-1} \\ \phi_k \\ \phi_{k+1} \\ \vdots \\ \phi_p \end{pmatrix} = \begin{pmatrix} \rho(1) \\ \vdots \\ \rho(k-1) \\ \rho(k) \\ \rho(k+1) \\ \vdots \\ \rho(p) \end{pmatrix} \quad (9)$$

The seasonal model module 914 solves Equation 9 to obtain initial values for the autoregressive parameters of the ARMA model of the seasonal difference. For example, the seasonal model module 914 may use the Durbin-Levinson algorithm to solve Equation 9.

The seasonal model module 914 then resamples the ARMA model of the seasonal difference to generate the seasonal dynamic ARMA model that represents the seasonal portion of the time-series data. The seasonal dynamic ARMA model of the seasonal portion of the time-series data may be expressed as Equation 10 below.

$$y_t = \phi_1 y_{t-s} + \phi_2 y_{t-2s} + \ldots + \phi_p y_{t-ps} + z_t \quad (10)$$

Although the coefficients $\phi_1^* \ldots \phi_p^*$ in Equation 8 and the coefficients $\phi_1 \ldots \phi_p$ in Equation 10 are linked to each other, they are not equal. To determine the coefficients $\phi_1 \ldots \phi_p$, the seasonal model module 914 coverts the ARMA model of the seasonal difference into a frequency-domain representation by applying the Z-transform. The fundamental properties of the Z-transform are as follows:

$$\begin{cases} x_n \xrightarrow{\mathcal{Z}} X(z) \\ x_{n-1} \xrightarrow{\mathcal{Z}} X(z)z^{-1} \\ x_{n-k} \xrightarrow{\mathcal{Z}} X(z)z^{-k} \end{cases} \quad (11)$$

The ARMA model of the seasonal portion of the time-series data may also be expressed as Equation 12 below.

$$Y(z) = \phi_1^* Y(z) z^{-1} + \phi_2^* Y(z) z^{-2} + \ldots + \phi_p^* Y(z) z^{-p} + Z(z) \quad (12)$$

The seasonal model module 914 applies the Z-transform to Equation 12, which results in the following polynomial:

$$\frac{Y(z)}{Z(z)} = \frac{1}{\phi_1^* z^{-1} + \phi_2^* z^{-2} + \ldots + \phi_p^* z^{-p}} \quad (13)$$

The seasonal model module 914 then factorizes the polynomial. Stated another way, the seasonal model module 914 finds the zeros ($z_{0k}$) of polynomial 14 below.

$$\frac{Y(z)}{Z(z)} = \frac{1}{\Pi_k (z_{0k}^{-1} - z^{-1})} \quad (14)$$

The seasonal model module may use either a root finding algorithm or a direct formula to find the zeros of polynomial 14. The seasonal model module then performs a form of interpolation on the identified zeros. Specifically, the identified zeros are translated in the continuous form—the s-form—and then sampled at a new rate. The translation and sampling are based on the following identities:

$$T = nT_s \quad (15)$$

$$\begin{cases} z_{(T_s)} = e^{sT_s} \\ z_{(T)} = e^{sT} = e^{snT_s} = (e^{sT_s})^n = z_{(T_s)}^n \end{cases}$$

Specifically, the seasonal model module 914 uses the resampling formula expressed in Equation 16 below.

$$z_{(nT_s)} = z_{(T_s)}^n \quad (16)$$

The seasonal model module 914 generates a transformed polynomial by applying the resampling formula to the factorized polynomial and then expands the transformed polynomial. The seasonal model module 914 determines the autoregressive portion of the seasonal dynamic ARMA model by converting the expanded polynomial from the frequency domain into the time domain. For example, the seasonal model module 914 applies the inverse Z-transform to the expanded polynomial.

Once the seasonal model module 914 determines the autoregressive portion of the seasonal dynamic ARMA model, the seasonal model module 914 jointly determines the autoregressive parameters and the moving average parameters of the ARMA model of the seasonal portion of the time-series data by maximizing the likelihood function of the seasonal dynamic ARMA model.

In general, a likelihood function is defined as the probability of observing data using a given model and its parameters. The result of a likelihood function is a number between 0 and 1. The closer the model fits to the observed data, the closer the result of the likelihood function is to 1. The likelihood function of ARMA models may be expressed as:

$$\mathcal{L}(\phi_i, \theta_j) = \mathbb{P}[z_1, z_2, \ldots, z_n | \phi_i, \theta_j] \quad (17)$$

The seasonal model module 914 uses a Kalman filter to calculate the likelihood function based on the time-series data and the parameters of the seasonal dynamic ARMA model. Using a Kalman filter to determine a likelihood function of a model includes: making a prediction using the model, comparing the prediction to real data to determine an observed error, and updating the model based on the observed error.

In general, the state-space of an ARMA model may be expressed as:

$$\xi_t = \begin{pmatrix} \phi_1 & \phi_2 & \cdots & \phi_{r-1} & \phi_r \\ 1 & 0 & \cdots & 0 & 0 \\ 0 & 1 & \cdots & 0 & 0 \\ \vdots & \vdots & \cdots & \vdots & \vdots \\ 0 & 0 & \cdots & 1 & 0 \end{pmatrix} \xi_{t-1} + \begin{pmatrix} \epsilon_t \\ 0 \\ 0 \\ \vdots \\ 0 \end{pmatrix} \quad (18)$$

$$x_t = \mu + (1 \ \theta_1 \ \theta_2 \ \cdots \ \theta_{r-1}) \xi_t$$

The state space of an ARMA model in the framework of the Kalman filter may be expressed as:

$$\xi_t = F\xi_{t-1} + v_t \quad (19)$$
$$x_t = \mu + {}^tH\xi_t$$

$$\text{Var}(v_t) = Q = \begin{pmatrix} \sigma^2 & 0 & \cdots & 0 \\ 0 & 0 & \cdots & 0 \\ \vdots & \vdots & \ddots & \vdots \\ 0 & 0 & \cdots & 0 \end{pmatrix}$$

F, H, and Q are matrices that are not time-dependent. Matrix F includes the autoregressive parameters of the ARMA model and matrix H—the Hessian matrix—includes the moving average parameters of the ARMA model.

The seasonal model module 914 determines the parameters of the seasonal dynamic ARMA model by maximizing the likelihood function using the Newton algorithm. The Newton algorithm is an iterative algorithm defined by Equation 20 below.

$$P_{k+1} = P_k - H^{-1}\nabla\mathcal{L} \quad (20)$$

$\nabla\mathcal{L}$ is the gradient of the likelihood function of the ARMA model. P represents the autoregressive and moving average parameters of the ARMA model. H is the Hessian matrix of expression 18. The seasonal model module 914 initializes the Newton algorithm by setting the autoregressive parameters of $P_0$ to the initialized values of the model—for example, the solution of the Yule-Walker equation—and the moving average parameters of $P_0$ to zero. The seasonal model module 914 iteratively calculates the value of Equation 20. In response to the convergence of P, the seasonal model module 914 generates the seasonal dynamic ARMA model. Specifically, the seasonal model module 914 sets the autoregressive and moving average parameters of the seasonal dynamic ARMA model to the values of P and calculates the values of $\varepsilon_t$ of the seasonal ARMA model based on the determined observed error from the application of the Kalman filter. The seasonal model module 914 provides the seasonal model of the time-series data to the residual calculation module 908 and a combination module 924.

The residual calculation module 908 determines a value of the residual ($z_t$ in Equation 10) of the seasonal dynamic ARMA model based on the time-series data. The value of the residual is a set of time-series values that represents the non-seasonal aspect of the time-series data. The residual calculation module 908 provides the determined residual to a non-seasonal model module 920.

The non-seasonal model module 920 generates the non-seasonal dynamic ARMA model that represents the non-seasonal aspects of the time-series data. To generate the non-seasonal dynamic ARMA model, the non-seasonal model module 920 initializes the autoregressive parameters of the non-seasonal dynamic ARMA model using the Yule-Walker equation. Specifically, the non-seasonal model module 908 uses the Yule-Walker equation to link the value of the determined residual to the autoregressive parameters. For example, the determined residual may be used as the input to Equation 9 described above. Similar to the seasonal model module 914, the non-seasonal model module 920 uses the Durbin-Levinson algorithm to solve the Yule-Walker equation to determine the initial autoregressive values of the non-seasonal dynamic ARMA model.

The non-seasonal model module 920 then jointly estimates the autoregressive parameter, the moving average parameters, and the prediction error of the non-seasonal dynamic ARMA model using the Kalman filter and the Newton algorithm, as previously described. The non-seasonal model module 920 provides the non-seasonal dynamic ARMA model of the time-series data to the combination module 924.

The combination module 924 generates the seasonal ARMA model of the time-series data based on the seasonal dynamic model generated by the seasonal model module 914 and the non-seasonal dynamic model generated by the non-seasonal model module 920. For example, the combination module 924 may multiply a first transfer function that represents the seasonal dynamic model by a second transfer function that represents the non-seasonal dynamic model. The result of the multiplication is a third transfer function that represents the seasonal ARMA model of the time-series data. The combination module 924 provides the seasonal ARMA model—the third transfer function—to a selection module 928.

The standard model module 910 generates a standard ARMA model of the time-series data. The standard model module 910 may use the Yule-Walker equation to link the time-series data to the autoregressive parameters of the standard ARMA model. For example, the standard model module 910 may use the time-series data as the input to Equation 9 described above. The standard model module 910 uses the Durbin-Levinson algorithm to solve the Yule-Walker equation to determine the initial autoregressive values of the standard ARMA model.

The standard model module 910 then jointly estimates the autoregressive parameters, the moving average parameters, and the prediction error of the standard ARMA model using the Kalman filter and the Newton algorithm, as previously described. The standard model module 910 provides the standard ARMA model of the time-series data to the selection module 928.

The selection module 928 outputs the model of the time-series data based on the determined periodicity of the time-series data. For example, in response to the periodicity data indicating that a seasonal trend—in other words, a period—exists in the time-series data, the selection module 928 outputs the seasonal ARMA generated by the combination module 924 as the model of the time-series data. Alternatively, in response to the periodicity data indicating that a seasonal trend does not exist in the time-series data, the selection module 928 outputs the standard ARMA model generated by the standard model module 910 as the model of the time-series data.

Flowcharts

Figure 13:
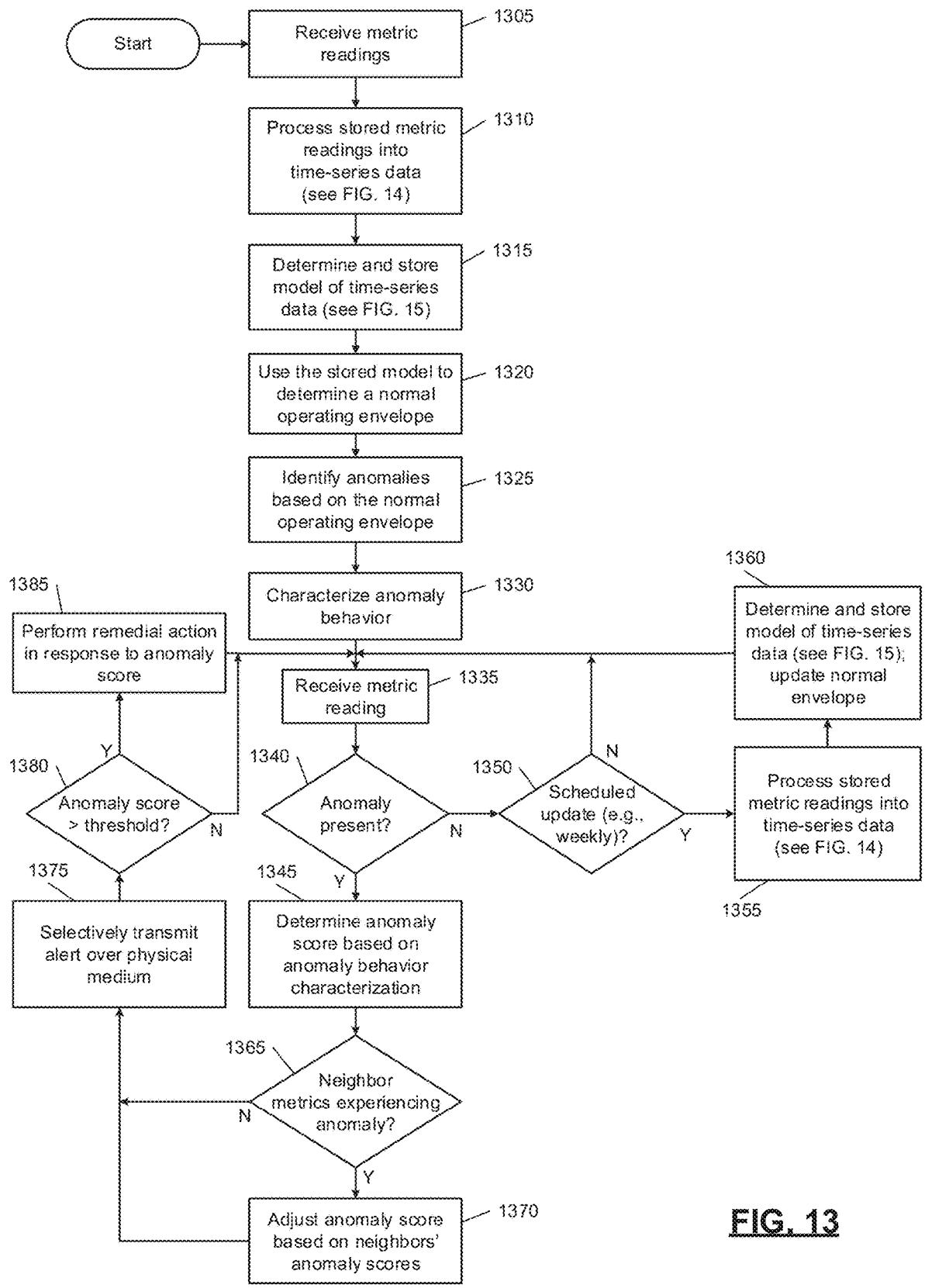
FIG. 13 is a flowchart of an overall analysis process performed for each metric.

In FIG. 13, overall control for a single metric is shown. The process may be performed in parallel on each metric of interest to the system. In some implementations, the process may detect anomalies partially based on values from other metrics. While the process for each metric may conceptually run in parallel, a finite number of processor threads and/or amount of memory space will result in the metrics not all being processed simultaneously.

At 1305, control receives readings for the metric. The initial set of metric readings may represent historical data that can be used for establishing a normal operating envelope. In addition, characteristics of anomalies may also be determined from the historical data. At 1310, control processes stored metric readings into time-series data, as described in more detail in FIG. 14.

Figure 15:
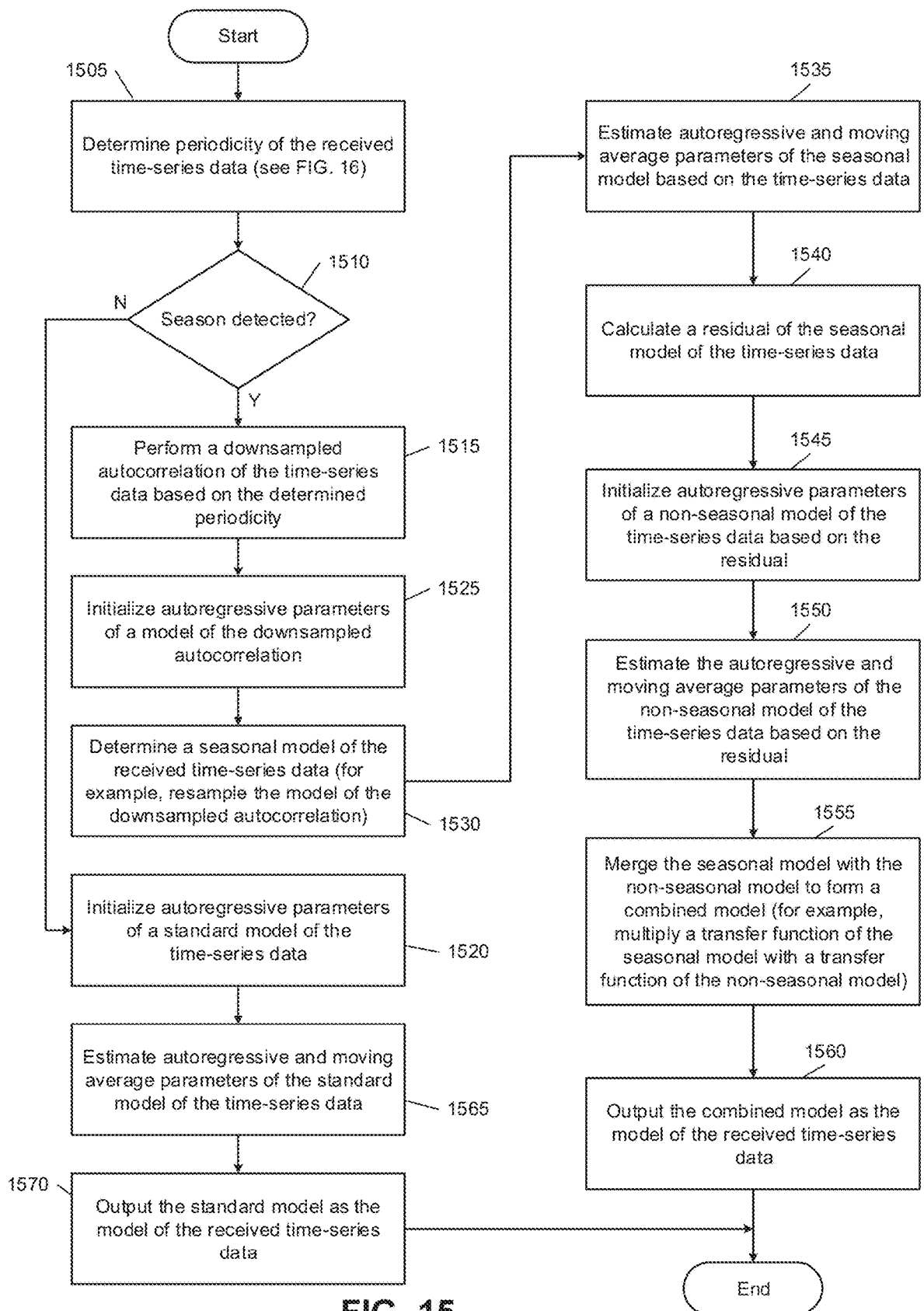
FIG. 15 is a flowchart of an example process of forming a model from time-series data.

At 1315, control determines and stores a model of the time-series data based on a determined periodicity profile of the time-series data, as described in more detail in FIG. 15.

At 1320, control uses the stored model of the time-series data to determine a normal operating envelope for the metric. For example, control may calculate the normal operating envelope as a function of time that specifies a range of expected values based on a Gaussian distribution.

At 1325, control identifies anomalies in which the metric deviates from the normal operating envelope. At 1330, control characterizes anomaly behavior. At 1335, control receives new metric readings. At 1340, control determines whether an anomaly is present in the new metric readings. For example, control may determine if an anomaly is present if the new metric readings fit the profile of anomalous behavior and deviate from the normal operating envelope. If an anomaly is present, control progresses to 1345; otherwise, control transfers to 1350.

At 1350, if the amount of time since metric readings were last characterized has exceeded a certain threshold, such as a week, control transfers to 1355; otherwise, control returns to 1335. At 1355, control processes stored metric readings into time-series data, as described in more detail in FIG. 14. Control then progresses to 1360, where control determines and stores a model of the time-series data according to FIG. 15 and updates the normal operating envelope based on the newly determined model. At 1360, control may also update the anomaly characterization. Control then returns to 1335.

Returning to 1345, control determines an anomaly score of the detected anomaly based on the anomaly behavior characterization. Control continues with 1365, where control determines whether neighboring metrics are also experiencing an anomaly. If so, control progress to 1370; otherwise, control transfers to 1375.

At 1370, control adjusts the anomaly score based on the anomaly scores of the neighboring metrics. For further discussion of neighboring metrics and how scores of neighboring metrics can be used, see U.S. Pat. No. 10,061,632, issued on Aug. 28, 2018, titled "System and Method for Transforming Observed Metrics into Detected and Scored Anomalies," the entire disclosure of which is incorporated by reference.

At 1375, control selectively transmits an alert based on the anomaly over a physical medium. For example, the alert may be sent via wired or wireless networking protocols to an operator of the equipment where the anomaly was observed or to a monitoring service responsible for monitoring the system where metrics are gathered. The alert may be entered into a log file stored in a computer readable medium, which may be written to long-term storage on a periodic basis. The alert may also result in visual inspection by an administrator.

At 1380, if the anomaly score is greater than a threshold, control transfers to 1385. Otherwise, control returns to 1335. At 1385, control performs automated remedial action in response to the anomaly score. For example, some metrics may indicate that a server is overloaded. The automated remedial action may be to invoke additional virtual server instances to allow for load sharing. Another remedial action may be to reduce the priority of or pause administrative tasks, such as system updates or storage rebalancing. In other words, if a server or router is being overly taxed by background processes that attempt to balance data storage across various servers or various locations, those background tasks may be paused to avoid hampering foreground tasks such as user access. Control then returns to 1335.

Figure 14:
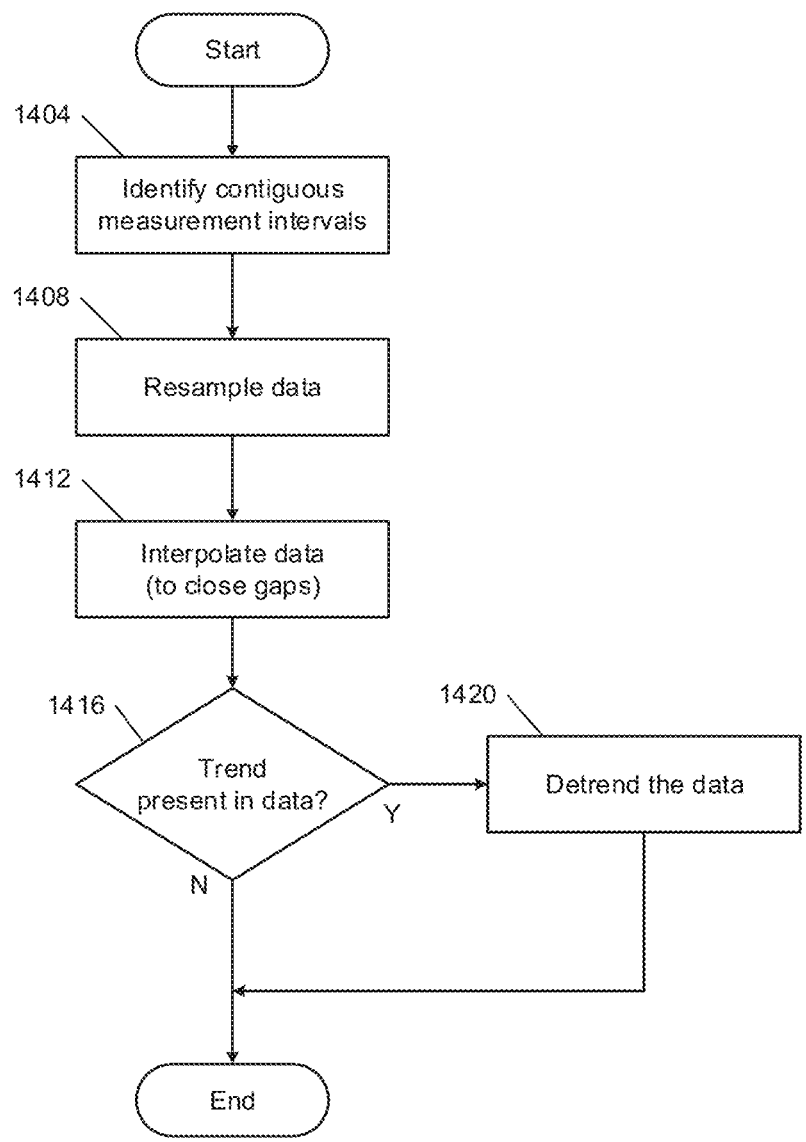
FIG. 14 is a flowchart of example initial processing of time-series data.

In FIG. 14, example preprocessing of stored metric readings begins at 1404 where control identifies contiguous measurements. Sets of data for one metric separated by a large gap of time may be processed as separate metrics. Their periodicities may then be different and in various implementations the periodicity of the more recent set of data may control.

At 1408, data is resampled. Resampling data may include determining values for the metric at equally spaced increments of time. Extrapolation and interpolation may be used on data sampled at irregular intervals to estimate the metric values that would have been obtained using a constant sampling interval. At 1412, control interpolates missing data points to create a set of uniform-sampled data points.

At 1416, control determines whether a trend is present in the data, such as by performing a linear regression and determining whether the slope of the resulting line is non-zero. If a trend is present, control transfers to 1420; otherwise, control ends. At 1420, control de-trends the data. In some implementations, control may subtract the trend line from the data. In other implementations, the data may be passed through a high-pass filter. Control then ends.

In FIG. 15, example determination of a model of time-series data begins at 1505. At 1505, control determines periodicity data of the time-series data, as described in more detail in FIG. 16. At 1510, control determines whether a season was detected based on the determined periodicity data. If the periodicity data indicates that a seasonal trend exists in the time-series data, control progresses to 1515; otherwise, control transfers to 1520.

At 1515, control performs a downsampled autocorrelation of the time-series data. For example, control may determine the length of the season based on the detected period and the sampling rate of the time-series data. Control may then calculate the value of the ACF of the seasonal difference of the time-series data sampled at integer multiples of the detected season. Control then progresses to 1525, where the autoregressive parameters of a model of the downsampled ACF are initialized. For example, control may use the Yule-Walker equation to link the downsampled ACF to the autoregressive parameters and use the Durbin-Levinson algorithm to obtain initial values for the autoregressive parameters. Control then progress to 1530.

At 1530, control determines a seasonal model of the time-series data based on the downsampled ACF. For example, control may resample the model of the downsampled ACF based on the determined periodicity of the time-series data. Control progress to 1535, where control estimates the parameters of the seasonal model of the time-series data based on the initialized autoregressive parameters and the time-series data. For example, control may use the Kalman filter and the Newton algorithm to maximize the likelihood function of the seasonal model of the time-series data. Control continues with 1540.

At 1540, control calculates the residual of the seasonal model of the time-series data. In other words, control determines the difference of the time-series data and the autoregressive portion of the seasonal model. At 1545, control initializes the autoregressive parameters of the non-seasonal model based on the determined residual and the time-series data. For example, control my use the Yule-Walker equation to link the value of the determined residual to the autoregressive parameters and use the Durbin-Levinson algorithm to obtain initial values for the autoregressive parameters of the non-seasonal model. Control continues with 1550.

At 1550, control estimates the parameters of the non-seasonal model of the time-series data based on the initialized autoregressive parameters and the determined residual. For example, control may use the initialized autoregressive parameters and the determined residual as inputs to the Kalman filter and the Newton algorithm. Control continues with 1555, where control merges the seasonal model of the time-series data with the non-seasonal model of the time-series data to generate a combined model that represents both the seasonal and non-seasonal aspects of the time-data. In some implementations, control generates the combined model by multiplying a first transfer function that corresponds to the seasonal model by a second transfer function that corresponds to the non-seasonal model. Control continues with 1560, where control outputs the combined model as the model of the time-series data. Control then ends.

Returning to 1520, control initializes the autoregressive parameters of a standard ARMA model of the time-series data. For example, control my use the Yule-Walker equation to link the values of the time-series data to the autoregressive parameters and use the Durbin-Levinson algorithm to obtain initial values for the autoregressive parameters of the standard model. Control continues with 1565.

At 1565, control estimates the parameters of the standard model of the time-series data based on the initialized autoregressive parameters and the time-series data. For example, control may use the initialized autoregressive parameters and the time-series data as inputs to the Kalman filter and the Newton algorithm. Control continues with 1570, where control outputs the standard model as the model of the time-series data. Control then ends.

Figure 16:
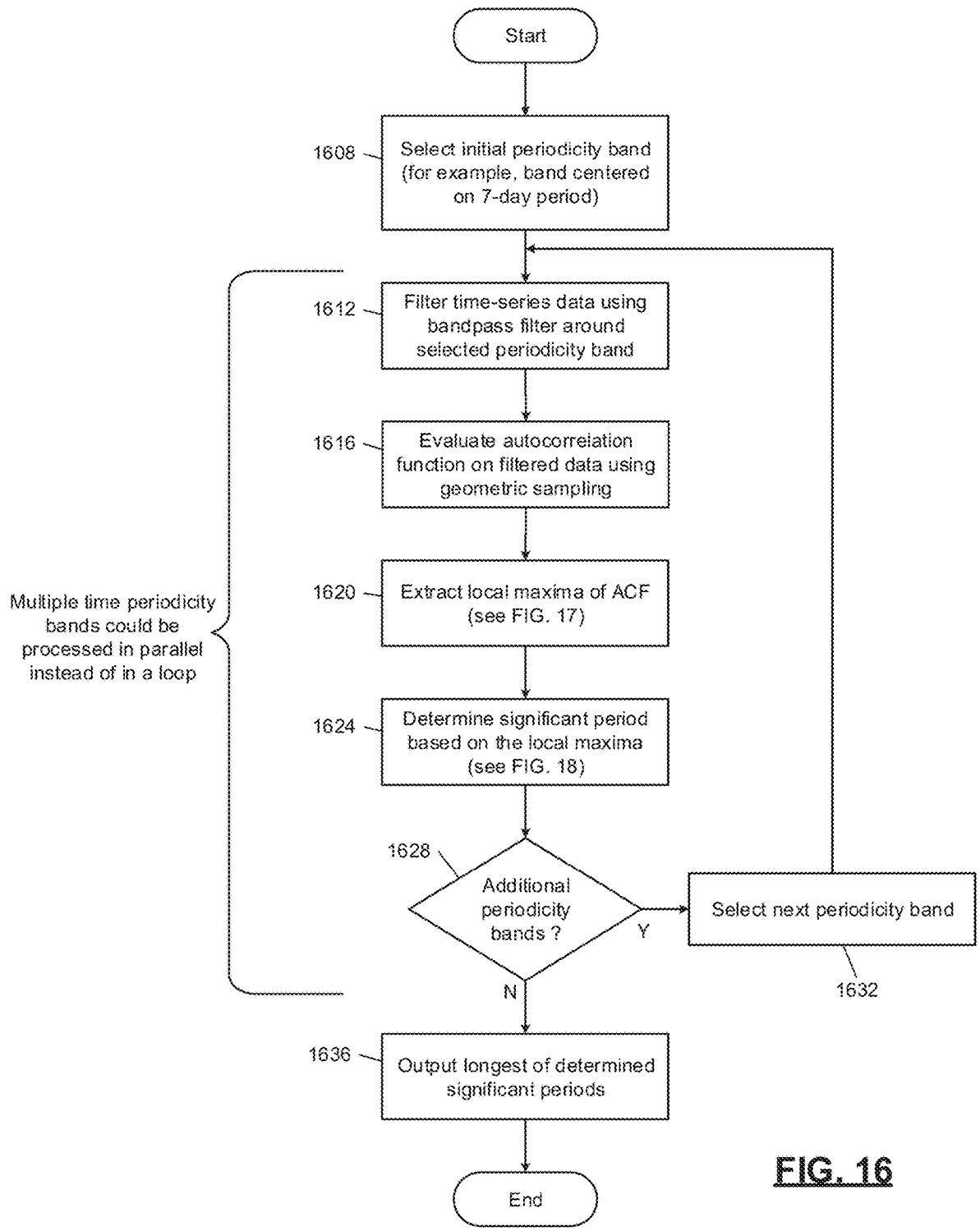
FIG. 16 is a flowchart of example periodicity characterization for a metric.

In FIG. 16, overall periodicity determination for a metric begins at 1608, where control selects an initial periodicity band. Each band is centered on a potential periodicity of the data. For example, a band centered on a seven-day period may encompass periods of approximately four days to approximately ten days.

At 1612, the time-series data is filtered by a bandpass filter designed around the selected periodicity band. For example, the bandpass filter may substantially reduce frequencies greater than once every four days or lower than once every ten days.

At 1616, control evaluates the ACF on the filtered data. For example, $\tau$ may be sampled using geometric or another form of non-linear sampling. At 1620, control extracts local maxima of the ACF, such as is described in FIG. 17. At 1624, control determines the presence of a significant period based on the local maxima, as described in more detail in FIG. 18. At 1628, control transfers to 1632 if there are additional periodicity bands to evaluate for the time-series. Otherwise, if all the periodicity bands have been evaluated, control transfers to 1636. At 1632, control selects the next periodicity band and returns to 1612.

The processing in 1612, 1616, 1620, and 1624 is shown being performed in series for each band, but could be performed in parallel. At 1636, control outputs the longest of the determined significant periods as the periodicity of the metric. Control then ends.

Figure 17:
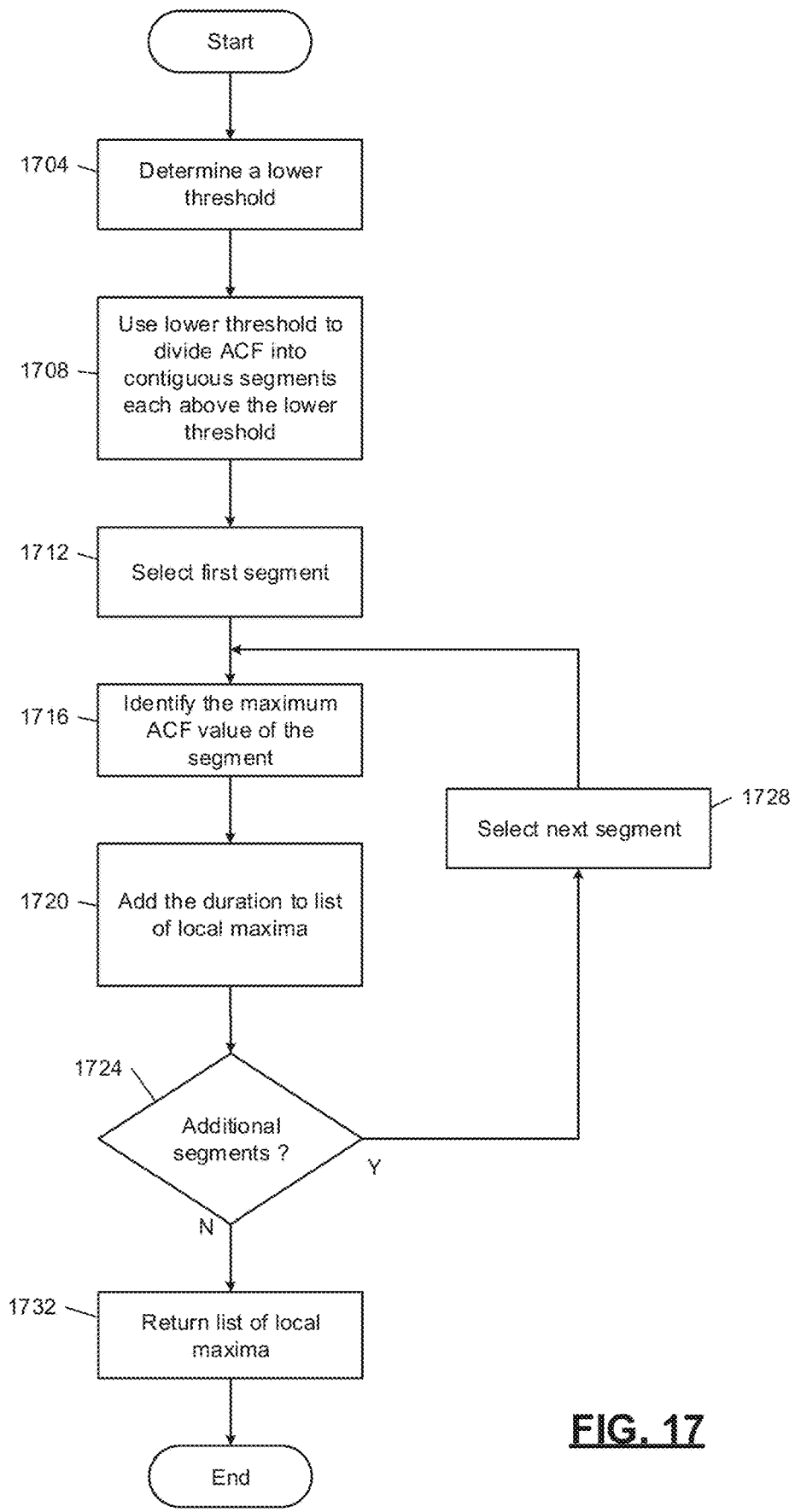
FIG. 17 is a flowchart of example local maxima extraction from an ACF.

In FIG. 17, local maxima extraction begins at 1704, where a lower threshold of a correlation value is determined. At 1708, the lower threshold is used to divide the ACF into contiguous segments that are each continuously above the lower threshold. At 1712, control selects the first segment.

At 1716, control identifies the maximum ACF value of the segment. At 1720, control adds the duration corresponding to the maximum ACF value to a list of local maxima. At 1724, control determines whether there are additional segments. If so, control transfers to 1728; otherwise, control transfers to 1732. At 1728, control selects the next segment and returns to 1716. At 1732, control returns the list of local maxima and then ends.

Figure 18:
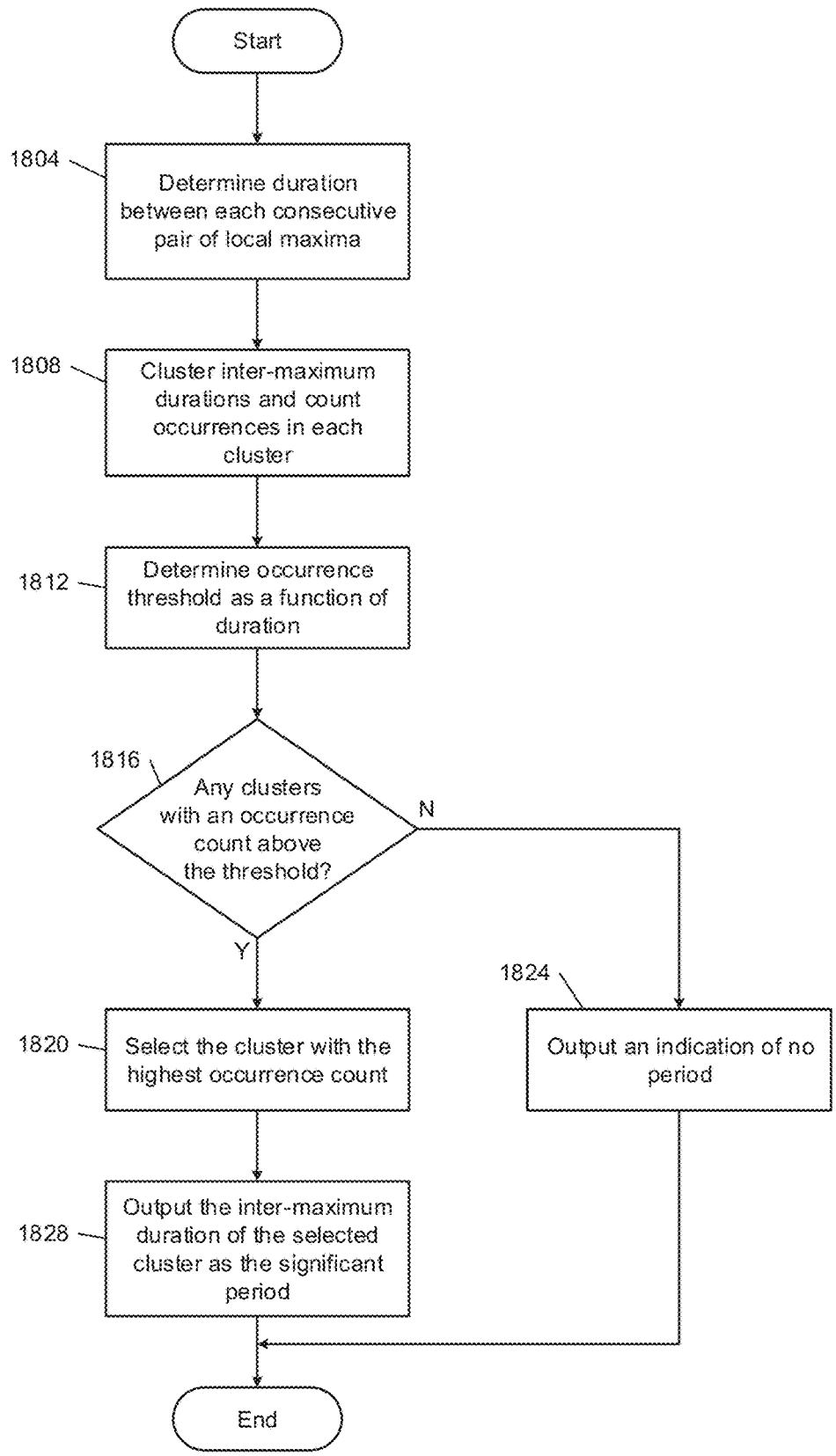
FIG. 18 is a flowchart of example period identification as part of periodicity determination.

In FIG. 18, identification of the significant period begins at 1804, where the duration between each consecutive pair of local maxima is calculated. At 1808, control clusters these inter-maximum durations and counts the number of occurrences in each cluster. At 1812, control determines an occurrence threshold, which may be a function of the duration.

At 1816, if there are any clusters with an occurrence count above the threshold, control transfers to 1820; otherwise, control transfers to 1824. At 1824, there were no statistically significant clusters and therefore control indicates that there is no period associated with this periodicity band. Control then ends. At 1820, control selects the cluster with the highest occurrence count. At 1828, control outputs the inter-maximum duration of the selected cluster as the significant period and control ends.

Filters

Analog filter technology is designed to work with continuous time. By contrast, digital filters are designed for a discrete time so are generally more suitable for a computer-based implementation. Since the theory of analog filters is more developed, a standard method is to first design an analog filter and then transform the designed analog filter to a digital filter. The bandpass filters referenced above may be designed using this process.

The standard Butterworth low-pass analog filter is defined by this transfer function:

$$H(s) = \frac{G_0}{B_n\left(\frac{\omega}{\omega_c}\right)}$$

where $B_n$ is:

$$B_n(s) = \prod_{k=1}^{\frac{n}{2}} \left[ s^2 - 2s\cos\left(\frac{2k+n-1}{2n}\pi\right) + 1 \right] \quad n = \text{even}$$

$$B_n(s) = (s+1)\prod_{k=1}^{\frac{n-1}{2}} \left[ s^2 - 2s\cos\left(\frac{2k+n-1}{2n}\pi\right) + 1 \right] \quad n = \text{odd}$$

The poles of the Butterworth filter are on the unit circle on the negative real half plane. An interesting property of the filter is that the gain is maximally flat in the passing band. Other filter designs may be used, such as Chebyshev and L-optimal.

To determine a standard low-pass filter $H_{std}(s)$ at a cut-off frequency $\omega_c$, the following transformation can be used:

$$s \mapsto \frac{s}{\omega_c}$$

and so:

$$H(s) = H_{std}\left(\frac{s}{\omega_c}\right)$$

Similarly, for a high-pass filter, the transformation is:

$$s \mapsto \frac{\omega_c}{s}$$

A band-pass filter for the two cut-off frequencies $\omega_{low}$ and $\omega_{high}$ begins with $\omega_m$ as the middle frequency:

$$\omega_m = \sqrt{\omega_{low}\omega_{high}}$$

and the dimensionless number measuring the size of the passing band is:

$$B = \frac{\omega_{high} - \omega_{low}}{\omega_m}$$

The following transformation is then used:

$$s \mapsto \frac{\left(\frac{s}{\omega_m} + \frac{\omega_m}{s}\right)}{B}$$

With the above notation, the transformation for the stop band is:

$$s \mapsto \frac{B}{\left(\frac{s}{\omega_m} + \frac{\omega_m}{s}\right)}$$

To convert an analog transfer function into a digital filter, the bi-linear transformation, an expression of the trapezoid integration method, can be used:

$$s \mapsto \frac{2}{T}\frac{z-1}{z+1} = \frac{2}{T}\frac{1-z^{-1}}{1+z^{-1}}$$

The analog frequencies are then mapped to the digital frequencies:

$$\omega_a = \frac{2}{T}\tan\left(\frac{\omega 2}{T}\right)$$

For a transfer function defined in Z-plane, a recursive algorithm can be derived for computing the filtered series. Assume the filter is defined by:

$$H(z) = \frac{Y(z)}{X(z)} = \frac{N(z^{-1})}{D(z^{-1})} = \frac{n_0 + n_1 z^{-1} + n_2 z^{-2} \ldots}{d_0 + d_1 z^{-1} + d_2 z^{-2} \ldots}$$

If $d_0 \neq 0$, the numerator and the denominator can both be divided by $d_0$. Assuming that $d_0 = 1$ leads to:

$$H(z) = \frac{Y(z)}{X(z)} = \frac{n_0 + n_1 z^{-1} + n_2 z^{-2} \ldots}{1 + d_1 z^{-1} + d_2 z^{-2} \ldots}$$

Solving for Y(z) results in:

$$Y(z) = X(z)[n_0 + n_1 z^{-1} + n_2 z^{-2} \quad \ldots \quad ] - Y(z)[d_1 z^{-1} + d_2 z^{-2} \ldots]$$

Then applying the inverse Z-transform results in:

$$y[y] = n_0 x[t] + n_1 x[t-1] + n_2 x[t-2] + \ldots - d_1 y[t-1] - d_2 y[t-2] - \ldots$$

This equation allows the derivation of a simple algorithm for filtering the Fourier domain. First, the size of the buffer for the input can be equal to the degree of the numerator and the size of the buffer for the output of the filter can be the degree of the denominator. As an example, for a low-pass Butterworth filter of order 3, the last three values of the output need to be buffered and none of the previous values of the input need to be retained. In contrast to a finite impulse response filter, the size of this buffer is generally lower, and is not dependent on the cut-off frequencies. For the filters used in the anomaly detection system, each bank filter can be designed using a third-order Butterworth filter with specific cut-off frequencies related to the range of periodicity corresponding to the filter.

CONCLUSION

The principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a metric data store configured to receive and store a time-series of values of a first metric, wherein the first metric corresponds to a measurement of computing system performance;
a seasonal trend identification module configured to determine a periodicity profile for the first metric based on the time-series of values;
a modeling module configured to generate an autoregressive moving average (ARMA) model of the time-series of values based on the periodicity profile for the first metric, wherein the modeling module includes:
  a seasonal model module configured to generate a first model, wherein the first model represents a seasonal characteristic of the time-series of values,
  a non-seasonal model module configured to generate a second model, wherein the second model represents a non-seasonal characteristic of the time-series of values, and
  a combination module configured to generate a third model based on the first model and the second model, and
  wherein the modeling module is configured to, in response to the periodicity profile indicating that a first periodicity profile describes the time-series of values, output the third model as the ARMA model of the time-series of values;
an envelope determination module configured to determine an operating envelope that indicates normal behavior of the first metric based on the ARMA model of the time-series of values;
an anomaly identification module configured to identify an anomaly in present values of the first metric in response to the present values deviating outside the operating envelope; and
an alert module configured to selectively generate an alert message in response to the identified anomaly and transmit the alert message to a designated user over a network interface.

2. The system of claim 1 wherein:
the modeling module includes an autocorrelation module configured to calculate a downsampled autocorrelation function (ACF) based on the time-series of values and the periodicity profile; and
the seasonal model module is configured to generate the first model based on the downsampled ACF.

3. The system of claim 2 wherein a rate of the downsampled ACF is proportional to the first periodicity profile.

4. The system of claim 2 wherein calculating the downsampled ACF includes calculating an ACF at an integer multiple of a period length associated with the first periodicity profile.

5. The system of claim 1 wherein:
the modeling module includes a residual calculation unit configured to determine a residual of the first model; and
the non-seasonal model module is configured to generate the second model based on the determined residual of the first model.

6. The system of claim 1 wherein the modeling module includes an outlier removal module configured to:
filter the time-series of values to remove irregularities, wherein filtering the time-series of values includes discarding values that are either greater than or less than a preceding value by a predetermined threshold; and
provide the filtered time-series of values to the seasonal trend identification module and the modeling module.

7. The system of claim 6 wherein the modeling module includes a time-series module configured to interpolate and detrend the time-series of values prior to filtering of the time-series of values by the outlier removal module.

8. The system of claim 1 further comprising an anomaly removal module configured to, prior to processing by the modeling module, remove values of the first metric associated with the anomaly identified by the anomaly identification module from the stored time-series of values in the metric data store.

9. The system of claim 1 wherein:
the modeling module includes a standard model module configured to generate a fourth model that represents the time-series of values; and
the modeling module is configured to, in response to the periodicity profile indicating that no periodicity profile describes the time-series of values, output the fourth model as the ARMA model of the time-series of values.

10. The system of claim 9 wherein:
the fourth model represents the non-seasonal characteristic of the time-series of values; and
the standard model module is configured to determine parameters of the fourth model based only on the time-series of values.

11. A computer-implemented monitoring method comprising:
receiving and storing a time-series of values of a first metric, wherein the first metric corresponds to a measurement of computing system performance;
determining a periodicity profile for the first metric based on the time-series of values;
generating an autoregressive moving average (ARMA) model of the time-series of values based on the periodicity profile for the first metric, wherein generating the ARMA model of the time-series values includes:
  generating a first model, wherein the first model represents a seasonal characteristic of the time-series of values,
  generating a second model, wherein the second model represents a non-seasonal characteristic of the time-series of values,
  generating a third model based on the first model and the second model, and
  in response to the periodicity profile indicating that a first periodicity profile describes the time-series of values, outputting the third model as the ARMA model of the time-series of values;
determining an operating envelope that indicates normal behavior of the first metric based on the ARMA model of the time-series of values;
identifying an anomaly in present values of the first metric in response to the present values deviating outside the operating envelope; and
selectively generating an alert message in response to the identified anomaly and transmitting the alert message to a designated user over a network interface.

12. The method of claim 11 wherein generating the first model includes:
calculating a downsampled autocorrelation function (ACF) based on the time-series of values and the periodicity profile; and
generating the first model based on the downsampled ACF.

13. The method of claim 12 wherein a rate of the downsampled ACF is proportional to the first periodicity profile.

14. The method of claim 12 wherein calculating the downsampled ACF includes calculating an ACF at an integer multiple of a period length associated with the first periodicity profile.

15. The method of claim 11 wherein generating the second model includes:
    determining a residual of the first model; and
    generating the second model based on the determined residual of the first model.

16. The method of claim 11 further comprising filtering the time-series of values to remove irregularities by discarding values that are either greater than or lesser than a preceding value by a predetermined threshold, wherein generating the first model includes calculating a down-sampled ACF based on the filtered time-series of values and the periodicity profile.

17. The method of claim 16 further comprising interpolating and detrending the time-series of values prior to filtering of the time-series of values.

18. The method of claim 11 further comprising removing values of the first metric associated with the identified anomaly from the stored time-series of values.

19. The method of claim 11 wherein the generating the ARMA model of the time-series values includes:
    generating a fourth model that represents the time-series of values, wherein the fourth model represents a non-seasonal characteristic of the time-series of values; and
    in response to the periodicity profile indicating that no periodicity profile describes the time-series of values, outputting the fourth model as the ARMA model of the time-series of values.

20. The method of claim 11 further comprising in response to receiving new time-series values of the first metric:
    generating an updated ARMA model; and
    determining an updated operating envelope that indicates normal behavior of the first metric based on the updated ARMA model.

* * * * *